(12) United States Patent
Ishihara et al.

(10) Patent No.: US 10,708,377 B2
(45) Date of Patent: Jul. 7, 2020

(54) COMMUNICATION CONTROL DEVICE, COMMUNICATION CONTROL METHOD, AND NON-TRANSITORY COMPUTER READABLE MEDIUM

(71) Applicant: TOSHIBA MEMORY CORPORATION, Minato-ku (JP)

(72) Inventors: Takeshi Ishihara, Yokohama (JP); Kensaku Yamaguchi, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 154 days.

(21) Appl. No.: 15/697,597

(22) Filed: Sep. 7, 2017

(65) Prior Publication Data
US 2018/0278708 A1 Sep. 27, 2018

(30) Foreign Application Priority Data
Mar. 21, 2017 (JP) ................. 2017-055064

(51) Int. Cl.
*H04L 29/06* (2006.01)
*H04L 29/08* (2006.01)

(52) U.S. Cl.
CPC ...... *H04L 67/2814* (2013.01); *H04L 67/1097* (2013.01); *H04L 67/2852* (2013.01); *H04L 67/32* (2013.01)

(58) Field of Classification Search
CPC ................................................ H04L 67/2814
See application file for complete search history.

(56) References Cited

U.S. PATENT DOCUMENTS

2011/0055312 A1* 3/2011 Purdy, Sr. ......... H04L 29/12066
709/203
2013/0013726 A1* 1/2013 Westberg ............ H04L 67/2847
709/213
2017/0078436 A1 3/2017 Ishihara et al.

FOREIGN PATENT DOCUMENTS

JP 2013-503390 1/2013
JP 5514315 6/2014
(Continued)

OTHER PUBLICATIONS

Xiaofei Wang et al., "Cache in the Air: Exploiting Content Caching and Delivery Techniques for 5G Systems", IEEE Communications Magazine, Feb. 2014, vol. 52, No. 2, pp. 131-139.

*Primary Examiner* — Adnan M Mirza
(74) *Attorney, Agent, or Firm* — Oblon, McClelland, Maier & Neustadt, L.L.P.

(57) ABSTRACT

According to one embodiment, a communication control device includes processing circuitry. The processing circuitry acquires at least either; wired communication characteristic information or wireless communication characteristic information from relaying devices or, storage characteristic information indicating usage of a plurality of storage devices storing data units that are transferred via the relaying devices and sent or received by a terminal in the wireless network or, data characteristic information indicating states of a plurality of data units stored in each of the storage devices. The processing circuitry is configured to receive a data acquisition request or a data saving request sent from the terminal and specify a relaying device or a storage device that processes the data acquisition request or the data saving request, and sends an instruction to the terminal, instructing to transmit the data acquisition request or the data saving request to the specified relaying device or the storage device.

18 Claims, 18 Drawing Sheets

(56) References Cited

FOREIGN PATENT DOCUMENTS

| JP | 2015-118407 A | 6/2015 |
| JP | 2017-58787 | 3/2017 |

* cited by examiner

| RELAYING DEVICE ID | DATA MANAGEMENT ID | REFERENCE COUNT |
|---|---|---|
| 00:00:5E:00:53:12 | HASH_ID1 | 7 |
| ... | ... | ... |

COMMUNICATION CONTROL DEVICE, COMMUNICATION CONTROL METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2017-055064 filed Mar. 21, 2017, the entire contents of which are hereby incorporated by reference.

FIELD

Embodiments described herein relate generally to a communication control device, a communication control method, and a non-transitory computer readable medium.

BACKGROUND

A switching hub and a wireless LAN (Local Area Network) access point are communication devices for relaying between networks. They are bridge devices which relay communications in the data link layer (layer 2). In addition, a router device relays communications in the network layer (layer 3). Currently, these devices are dedicated to relaying of communications, which means that they typically do not incorporate functions as storage. Meanwhile, the possibility of incorporating storage with communication devices is being investigated, with the advent of concepts such as ICN (Information Centric Networking), CCN (Content Centric Networking), edge computing, and fog computing.

By using CDN (Content Delivery Network), it is possible to distribute information widely through the Internet. In CDN, effective transmission of information is realized by placing a large number of cache servers in the network and transmitting information from the cache server which is closest to the terminal which issued a request. The cache server to use can be selected based on methods such as DNS or HTTP redirection.

By combining the abovementioned methods, it is possible to construct a CDN incorporating edge computing technology. By using CDN with edge computing technology, controlling the distribution of information and getting the history of the distribution, for small granularities are possible. Such tasks were difficult when conventional CDNs are used.

However, if conventional cache server selection methods are used, the successful selection of a cache server ready for edge computing is difficult. Since the number of communication devices installed in the edge network is very large, an enormous number of devices need to be taken into account. For example, in order to use the DNS-based selection method, a distributed database available from the entire Internet needs to be maintained. It is difficult to add and manage information on the workloads of the individual edge networks and caching devices to the above database. The situation is similar for cases when HTTP redirection is used. This is because DNS is also used to identify the HTTP server that issued the redirection.

If the cache server installed in the edge network were selected successfully, other problems still exist. If the cache server closest to the terminal which sent the request is always selected, there is a possibility that the requests concentrate in a specific cache server. In such cases, problems such as degraded I/O performance of the cache storage and exhaustion of the storage device may occur.

DETAILED DESCRIPTION

According to one embodiment, a communication control device includes processing circuitry. The processing circuitry is configured to acquire at least either; wired communication characteristic information or wireless communication characteristic information, for a plurality of relaying devices that relay communication between a wired network and a wireless network, from the relaying devices or a management server that manages the relaying devices or, storage characteristic information indicating usage of a plurality of storage devices storing data that is transferred via the relaying devices and sent or received by a terminal in the wireless network and connected directly to the relaying devices or connected via the wired network or, data characteristic information indicating states of a plurality of data units stored in each of the storage devices. The processing circuitry is configured to receive a data acquisition request or a data saving request sent from the terminal and specify a relaying device or a storage device that processes the data acquisition request or the data saving request based on at least either the wired communication characteristic information, the wireless communication characteristic information, the storage characteristic information, or the data characteristic information, and sends instructions to the terminal, instructing to transmit the data acquisition request or the data saving request to the specified relaying device or the storage device.

Hereinafter, embodiments of the present invention are explained below with reference to the drawings. The embodiments described below are only examples and other forms of implementations are also possible.

First Embodiment

<Overview of System>

Figure 1:
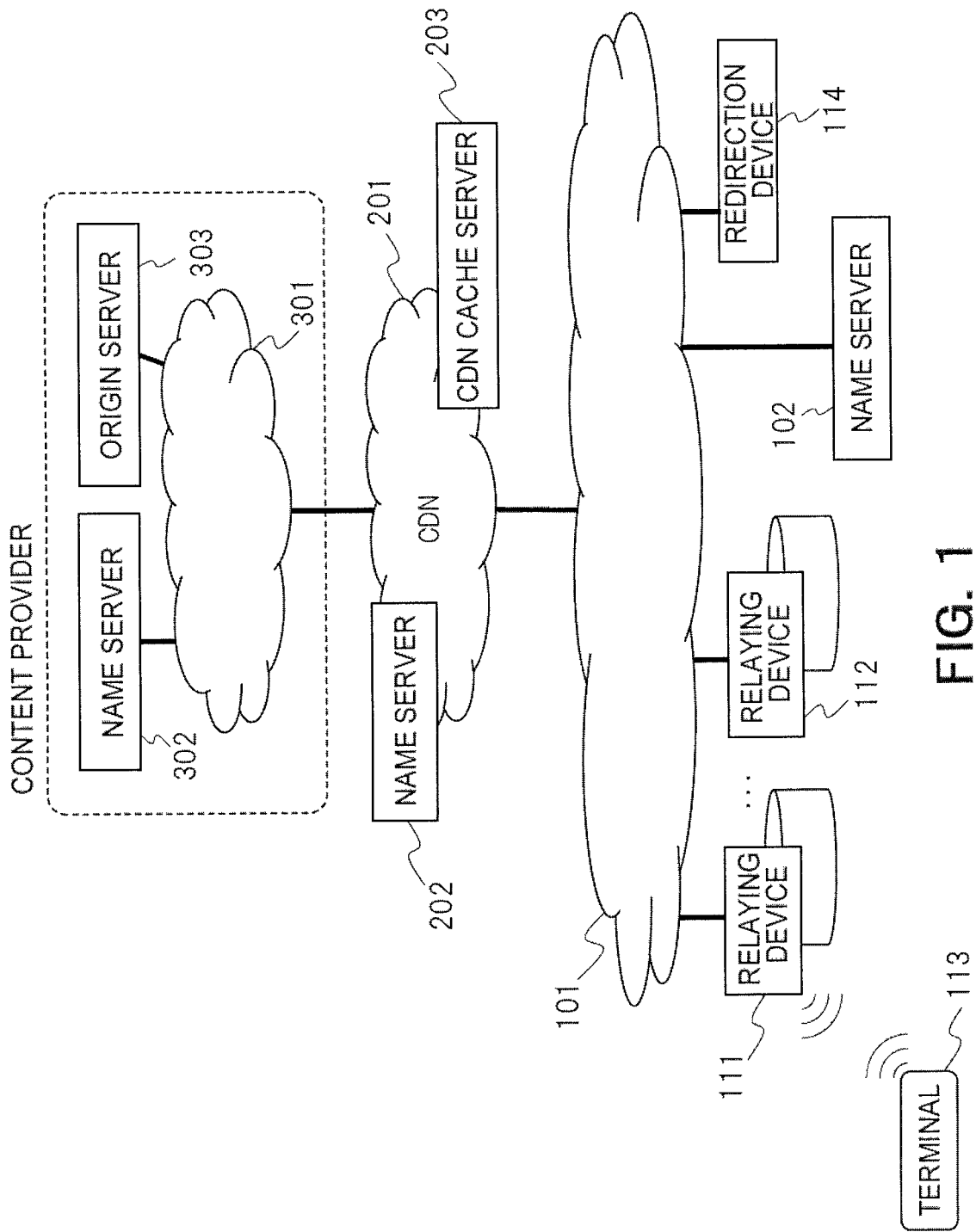
FIG. 1 is a diagram showing configuration of a communication system according to a first embodiment.

FIG. 1 is a configuration diagram of a communication system according to a first embodiment. Basically, three networks, i.e., an access network (wired network) 101, a CDN 201, and a content provider network 301 are illustrated, which are interconnected with a wide area network. Name servers 102, 202, and 302 are installed in the networks 101, 201, and 301, respectively. The name servers 102, 202, and 302 manage the correspondence relationship between the domain names and the IP addresses within the respective networks 101, 201, and 301. The name server 102 of the access network 101 has a relaying name server function for processing a name resolution request from a terminal. In this figure, a single name server is connected to each of the networks 101, 201, and 301, but multiple name servers can be connected to each network. Load balancing can be done between the multiple name servers.

The access network 101 is a network that provides the connection to the upper networks for the clients. Specific examples include an access network using optical fibers of a telecommunications provider or wireless LAN of a wireless provider. The access network 101 includes relaying devices 111 and 112 for providing network connection to a terminal, a communication control device (redirection device) 114 for distributing requests from a terminal 113 to the optimal relaying devices, the name server 102, or the like.

Figure 2A:
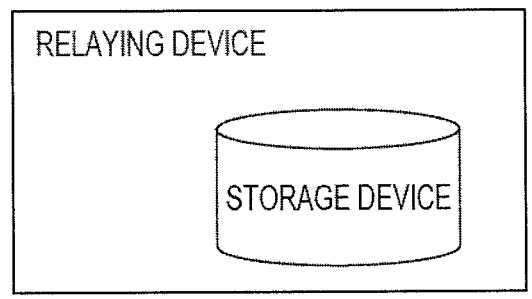
FIGS. 2A, 2B and 2C are diagrams that illustrate examples of connection modes between a relaying device and a storage device.
Figure 2B:
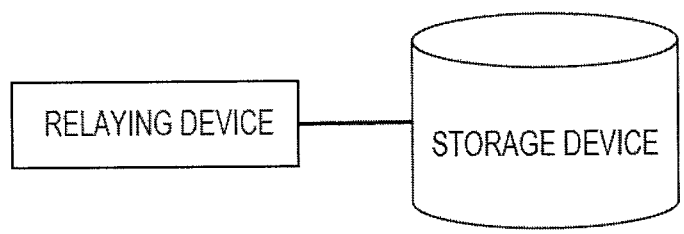
Figure 2C:
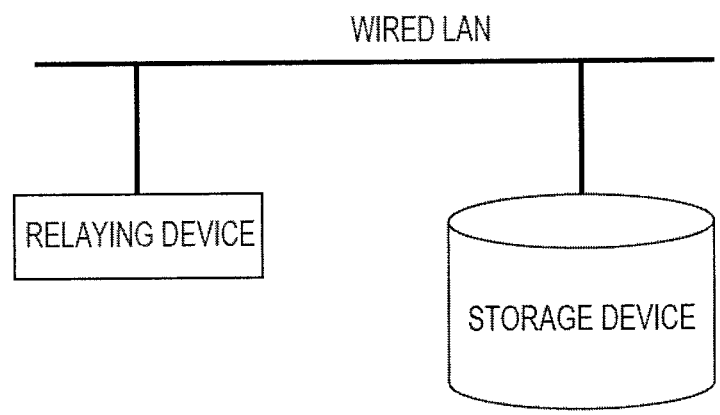

The relaying devices 111 and 112 each have a storage device for storing data. The storage device can be provided inside (internally connected) of the relaying devices 111 and 112, respectively. The storage device can be connected externally with a connector, a network such as wired LAN or the like. Individual examples are illustrated in FIGS. 2A to 2C. FIG. 2A illustrates an internal connection, FIG. 2B illustrates an external connection, and FIG. 2C illustrates a network connection respectively. FIGS. 2A and 2B illustrate direct connection mode while FIG. 2C illustrates network-based connection mode. Specific examples of connection configurations will be described later in detail within the context of other embodiments. It is assumed in the following descriptions that the relaying devices each have internal storage devices (internally connected storage devices) as illustrated in FIG. 2A. In the configuration of FIG. 2B or 2C, it is possible that the storage device has communication functionality enabling communications with the relaying devices, the redirection device, or the like via the network 101. In the following description, unless otherwise specified, each of the relaying devices includes storage devices.

Other devices besides those mentioned above are connected to the access network 101 but not illustrated. This is because they are not essential in the explanation of this embodiment.

The CDN 201 is a network of a content distributor and is operated by the content distributor. The CDN 201 includes a plurality of CDN cache servers that are interconnected (only one CDN cache server 203 is illustrated for the sake of simplicity in the figure) and the name server 202. The name server 202 has a database which stores the locations of the CDN cache servers 203 and their workload information. The database can be connected externally to the name server 202. The name server 202 can select the optimal CDN cache server, which is the CDN cache server in the closest location from to the terminal that issued a request, based on the information in the database. The name server 202 also sends information that indicates the selected CDN cache server in the response. The CDN cache server can also cache data provided by the content provider (distributed by an origin server 303), and select the optimal redirection device for the terminal that issued the request.

The content provider is a business entity which provides certain data or information through the Internet or the CDN 201. In order to transmit the data efficiently to a customer, the content provider makes a contract with a content distributor and distributes the contents using the CDN 201. The name server 302 and the origin server 303 are connected to the network 301 of the content provider. Data or information (hereinafter collectively referred to as data units) to be provided to the customer is stored in the origin server 303. The data units include the main body of data and attribute information such as identification of the data. Examples of the data units include, video data, image data, text data, combined data, or the like.

<Overall Sequence>

Figure 3:
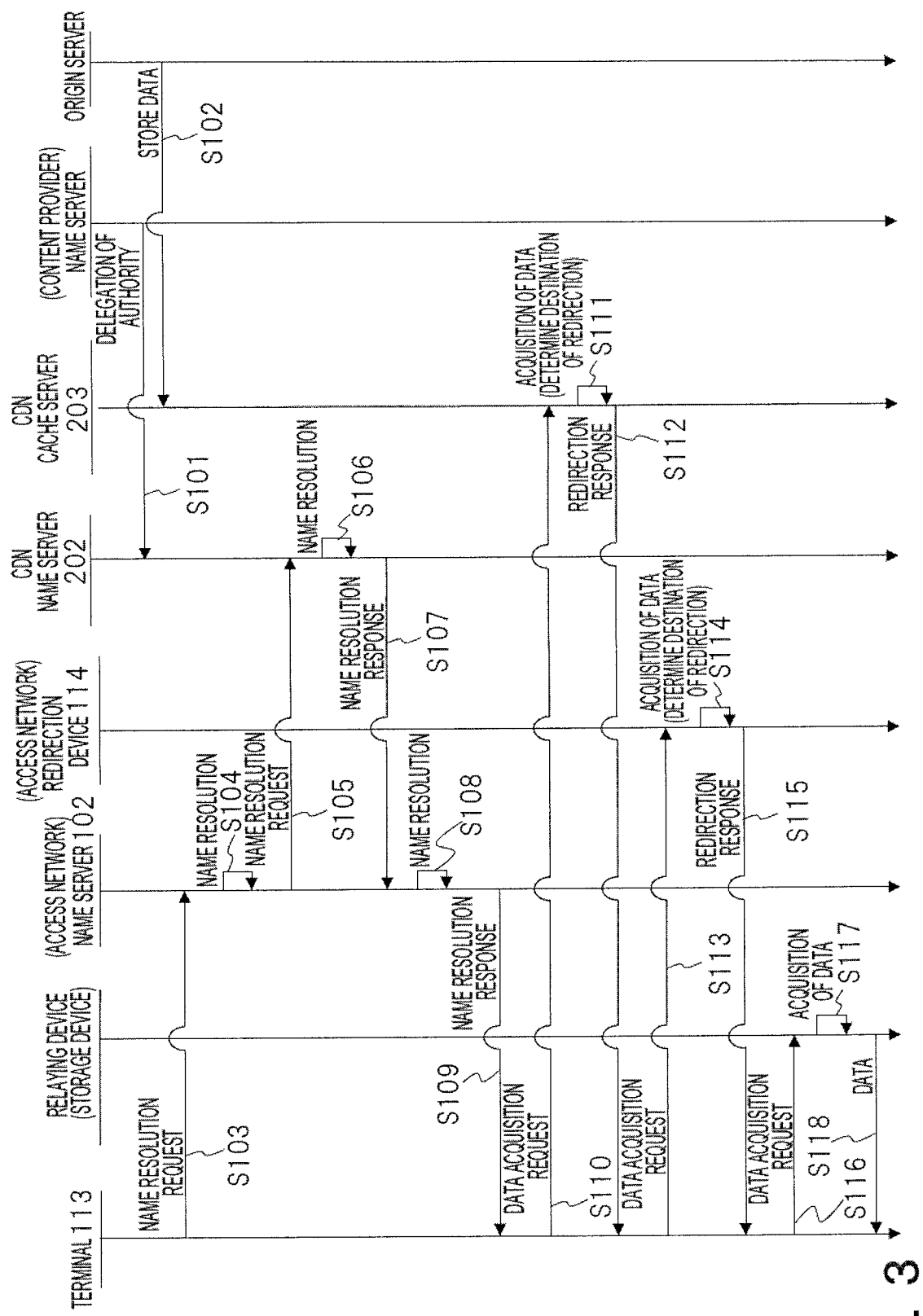
FIG. 3 is a diagram illustrating an overall sequence of the system according to the first embodiment.

FIG. 3 illustrates the overall sequence of this system. When the terminal 113 connected to the access network 101 acquires data units provided by the content provider, the overall process follows this sequence. In order to execute this sequence, the domain name management authority needs to be delegated from the content provider to the content distributor (S101) and the domain name needs to be managed by the name server of the content distributor. Data units are installed (cached) to the cache server 203 according to the contract for distribution of contents (S102).

If a URL is entered to a web browser or the like, a name resolution sequence is initiated by the terminal 113 to acquire specific data units. The name resolution request is sent to the name server 102 configured in the terminal 113 (S103). Commonly, the name server the terminal 113 uses is the name server in the access network 101, which is the network terminal 113 is connected. The name server 102 of the access network 101 identifies a name server (here, the name server 202 (hereafter referred to as a CDN name server)) that manages the domain name to be resolved (S104), and forwards the name resolution request to the name server 202 (S105).

The CDN name server 202 manages the IP address of the cache server 203, (hereinafter referred to as a CDN cache server) which is administrated by the content distributor. The CDN name server 202 refers to the IP address of the name resolution request sender (=the name server 102 of the access network 101), and identifies the IP address of the CDN cache server 203 that is the closest to the sender IP address in the network, having a low workload (S106). The CDN name server 202 sends a response including the identified IP address to the name server 102 (S107). The term "low workload" used herein means, that a value indicating the workload of the CPU is less than or equal to a threshold, for example. The term "being the closest on the network" used herein means that the number of hops is the smallest, for example. Another CDN cache server can be selected if it is not the closest CDN cache server but the network distance is equal to or less than the threshold value. Also, the decision may be made based on the physical distance rather than the network distance. The name server 102 of the access network 101 executes name resolution tasks based on the received response (S108), and sends the name resolution response back to the terminal 113 which is origin of the initial request (S109).

The terminal 113 which acquired the IP address of the access location sends a data acquisition request to the CDN cache server 203 with the corresponding IP address (S110). The data acquisition request can be transmitted by HTTP (or HTTPS). The data acquisition request is received by the CDN cache server 203 (S110). The CDN cache server 203 has information of at least one redirection device 114 operated by the content distributor. The CDN cache server 203 refers to the sender IP address (=the IP address of the terminal 113) of the data acquisition request and identifies the closest redirection device 114, which is in the closest location to the sender IP address (S111). The CDN cache server 203 sends a redirection response including the IP address of the redirection device 114 which is the destination of redirection (S112).

The terminal 113 which has received the IP address of the redirection destination sends a data acquisition request to the redirection device 114, which is the destination of redirection (S113). The redirection device 114 manages the IP addresses of the relaying devices within the scope, data usage of storage in the relaying devices, or the like. The redirection device 114 which has received the data acquisition request identifies the IP address of the optimal relaying device for the terminal 113, based on the information that is managed (S114). The redirection device 114 sends a redirection response including the identified IP address to the terminal 113 (S115).

When the terminal 113 receives the redirection response, a data acquisition request is sent to the relaying device with the IP address specified in the redirection response (S116). When the relaying device receives the data acquisition request, the data requested in the data acquisition request is read from its own storage device (S117). Then, the data that is read is sent to the terminal 113 (S118).

The description above is a summary of the overall operation of this system.

In the sequence of FIG. 3, the redirection device 114 is located in the access network 101, and the CDN cache server 203 specifies the redirection device 114 as the destination of redirection. Since the provider of the access network 101 and the content distributor may be different business entities, there is a possibility access between the domains are not permitted. It is assumed that in this embodiment, either of the following cases is true Case (1): The CDN cache server 203 is managed by the content distributor and the redirection device 114 is managed by the access network provider. The CDN cache server 203 can recognize the redirection device 114 if access is allowed by a contract or the like.

Case (2): The redirection device 114 is located in the network administrated by the access network provider, but the content distributor manages the redirection device 114.

[Additional Explanation: Redirection Device 114 with the CDN Cache Server Role]

In the sequence described above, the data acquisition request is forwarded to the relaying device after the two redirection responses (S112, S115). However, if the redirection device 114 is configured to serve as a CDN cache server only one round of redirection would be required. In that case, two methods are possible. One method is to increase the number of CDN cache servers managed by the CDN name server 202. (Since the redirection device 114 has CDN cache server functionality, the number of the redirection devices 114 will be increased.) Another method is to make the management scope of the CDN cache server smaller (namely, the CDN cache server functionality provided in the redirection device 114).

In the first method, the size of network managed by the CDN name server 202 would become extensive, increasing the size of information needed to be monitored. Information to be monitored includes the network status and the workload of the CDN cache servers (the CDN cache server functionality provided in the redirection device 114).

In the second method, it is necessary for the CDN cache server (the CDN cache server functionality provided in the redirection device 114) to recognize the storage status or the like for individual relaying devices, which may likewise increase the size of information that needs to be monitored.

During implementation of this embodiment, it is necessary to consider the trade-off relationship between the size of management information in the individual devices (the redirection device 114 having the CDN cache server functionality, the CDN name server 202, etc.) and the number of redirections.

<Configuration of Redirection Device 114>

Figure 4:
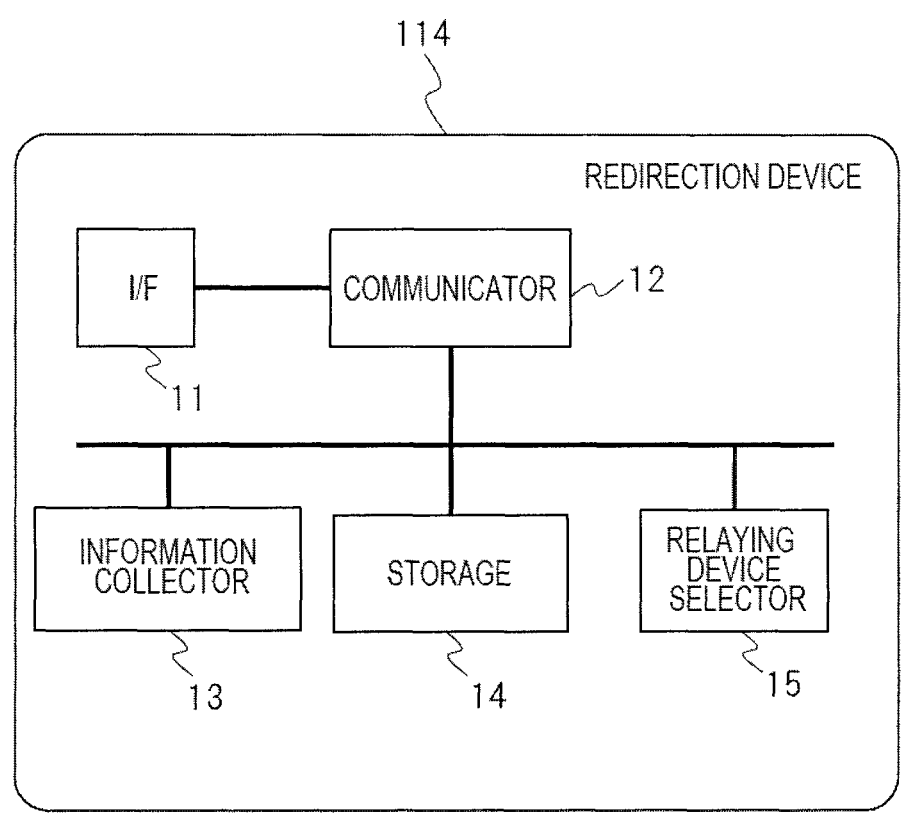
FIG. 4 is a block configuration diagram of a redirection device which is a communication control device according to the first embodiment.

FIG. 4 is a block configuration diagram of the redirection device 114 which is an example of the communication control device according to this embodiment. In this figure, only the elements necessary for explaining this embodiment are shown.

An I/F unit 11 is an interface providing connection to the network 101.

A communicator 12 is connected directly to the I/F unit 11. The communicator 12 is also connected to an information collector 13, a storage 14, and a determiner 15 via a bus or the like. The communicator 12 is configured to send and receive information or data via the network 101 by exchanging information and control signals with the I/F unit 11, the information collector 13, the storage 14, and the determiner 15. The communicator 12 is also configured to handle communication protocols necessary for transmission/reception (e.g., processing associated with TCP/IP) or the like. The communicator 12 is also configured to perform tasks needed to enable communication between devices, such as maintenance and control of IP addresses and domain name resolution.

The information collector 13 is configured to collect information pertaining to the relaying devices and the access network 101. Details of information to be collected will be described later.

The storage 14 can store information collected by the information collector 13. The storage 14 is configured from, for example, a memory, a storage device, or a combination of them.

The determiner 15 is configured to select the optimal relaying device for the terminal 113 which sent the data acquisition request. The selection is made based on the information stored in the storage 14. If the storage device has communication feature and is connected to a network such as the network 101 (FIG. 2C, etc.), the storage device can be selected as well.

Each functional block (the communicator 12, the information collector 13, and the determiner 15) illustrated in the configuration of FIG. 4, can be implemented by processing circuitry. In such cases, the processing circuitry may be dedicated circuit(s), or a processor such as a CPU which executes software (programs) for executing the functions, or a combination thereof, for example.

<Information Collected by the Redirection Device 114 and the Information Collecting Method>

The information collector 13 of the redirection device 114 collects characteristic information that indicate the states of the relaying devices located within the access network 101 and characteristic information (wired communication characteristic information) that indicates the network state of the access network 101. Characteristic information (wireless communication characteristic information) indicating the network state of the wireless network, storage characteristic information indicating the usage of the storage device, and data characteristic information (cache characteristic information) indicating the states of data units stored in the storage device, and characteristic information of the relaying device itself are examples of characteristic information. Examples of characteristic information to be collected are illustrated below. The redirection device 114 analyzes the information and selects the optimal relaying device for the terminal 113, which sent the data acquisition request.

(1) Data units stored in the relaying device and meta-data (identifiers and the sizes of stored data, the reference counts of data, and a ratio of valid data)
(2) Workloads of the relaying devices (e.g., the processing workload (busy rate) of the CPU, or the like.)
(3) Usage of storage devices implemented in the relaying devices (parameters such as the percentage of storage space used in the storage device, the number of rewrites, the error rate, or the like.)
(4) Communication performance (average throughput, average delay, average error rate, or the like.) of the wireless network the relaying device is connected directly (the network between the relaying device and the terminal 113). The communication performance of each terminal connected to the wireless network may be used.
(5) Channel quality (direction of radio wave arrival, arrival time of radio wave, difference of arrival time, RSSI, error rate, number of retransmissions, etc.) for each terminal connected to the wireless network the relaying device is connected directly (network between the terminal 113).
(6) Communication quality (throughput, RTT) of the wired network (network 101) connecting the relaying devices Information (1) corresponds to the data characteristic information (cache characteristic information). Information (2) corresponds to the characteristic information indicating the status of the relaying device. Information (3) corresponds to the storage characteristic information. Information (4) and (5) correspond to the wireless communication characteristic information. Information (6) corresponds to the wired communication characteristic information.

The information collector 13 of the redirection device 114 collects the characteristic information illustrated in above examples from the target devices for collection of information such as relaying devices or related network devices (devices such as switches, routers, or the like and their management devices). The information collector 13 collects characteristic information by referring to the value managed by an MIB in the target device for collection of information by SNMP. SNMP is only an example and other management protocols can be used. The information collector 13 can also collect attribute information by making an inquiry to a web server operating on the management server of the target device for collection of information by using the API.

Although information collection methods are not limited to the examples described above, it is preferable to use a method that does not put heavy workloads to the relaying devices. The roles can be divided clearly into roles for collecting the characteristic information and roles for referring to the characteristic information. A collecting device not shown in FIG. 1 or 3 can be provided additionally. The collecting device collects the characteristic information from each target device for collection of information and sends the collected characteristic information to the redirection device 114. The redirection device 114 uses the characteristic information sent from the collecting device (not shown).

<Storage Location Determination Algorithm (Arrangement Algorithm)>

There are two algorithms (arrangement algorithms) that the redirection device 114 uses to determine the relaying device to store the data. One determines the location of storage when a data acquisition request from the terminal 113 is received (which is hereinafter referred to as a determined-later-method). The other stores the location of storage first (determined-first-method) (e.g., before receiving the data acquisition request from the terminal 113). The two algorithms will be described below.

(Storage Location Determination Algorithm (Arrangement Algorithm): Determined-Later-Method)

Figure 5:
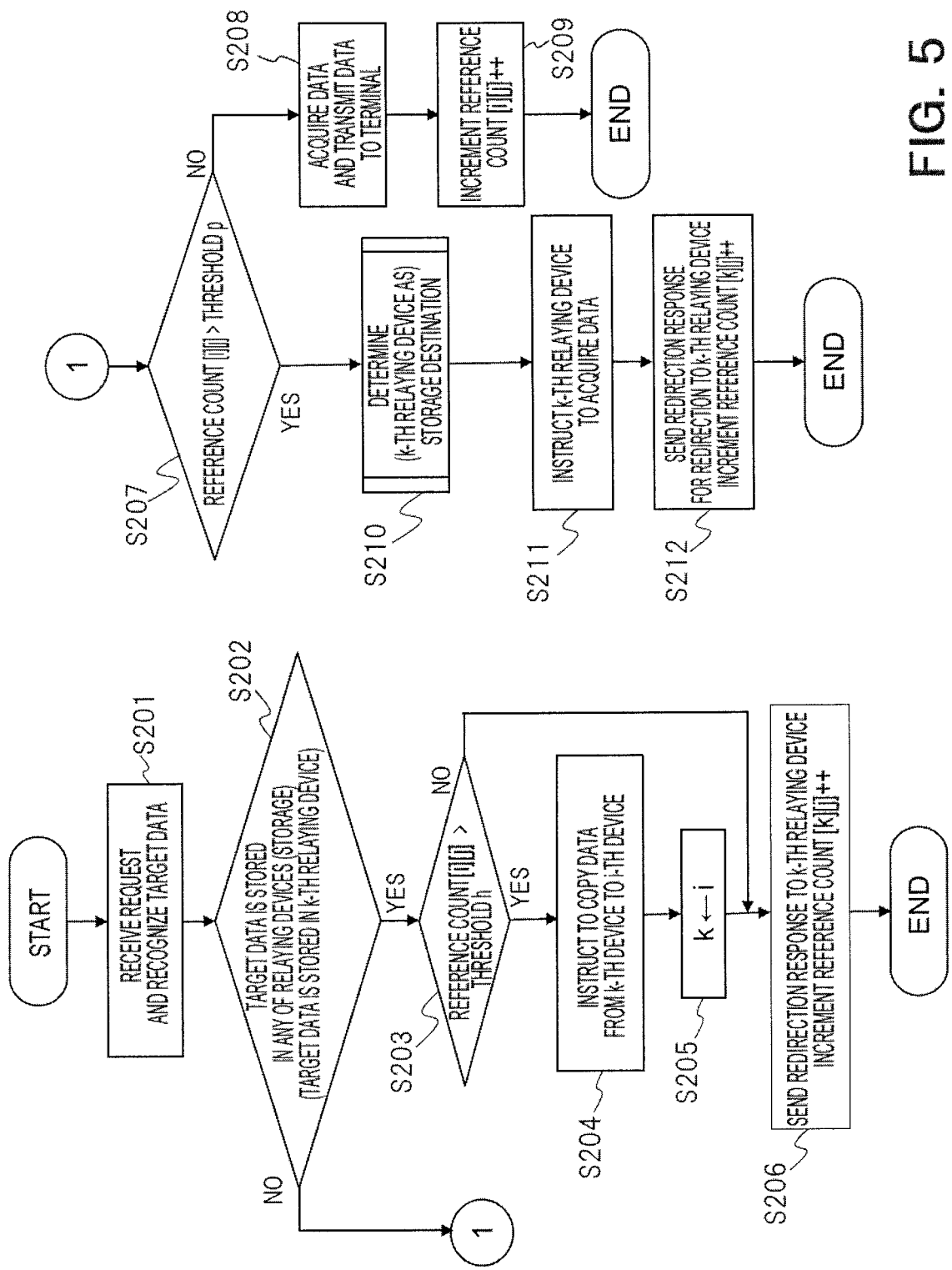
FIG. 5 is a diagram illustrating an algorithm of a determined-later-method to determine a location to store data.

FIG. 5 illustrates an algorithm of the determined-later-method. This algorithm is executed by the determiner 15 of the redirection device 114. To execute this algorithm, different identifiers need to be assigned to a plurality of relaying devices managed by the redirection device 114. Also, the redirection device 114 has a function of calculating a management identifier for data units by using a hash function or the like and a function for identifying the data units by the management identifier. The management identifier may be calculated from the data identifier (URL or the like), may be calculated from the data body and the URL, may be calculated using only the data body, or may be calculated by using any other methods. The redirection device 114 manages the status of data units saved in the storage in the respective relaying devices which are managed by the management database using the above two types of identifiers (the identifier for the relaying device and the data identifier). The management database is stored in the storage 14. Management tasks based on the management database is performed by the determiner 15 of FIG. 4 or another management unit (not shown).

This algorithm starts when the redirection device 114 receives a data acquisition request from the terminal 113 (S201). First, the data acquisition request is analyzed and the identifier of the target data unit requested from the terminal 113 is identified. For example, when receiving the data acquisition request by HTTP, an HTTP request is analyzed and the URL is identified as an identifier.

Subsequently, it is determined whether the target data unit is stored in the relaying device or one of the relaying devices managed by the redirection device 114 or not (S202). This can be done by applying a hash function to the identified URL to calculate the management identifier first and then checking the value of management identifier by referring to the management database in the storage 14 of the redirection device 114.

Figures 6, 7:
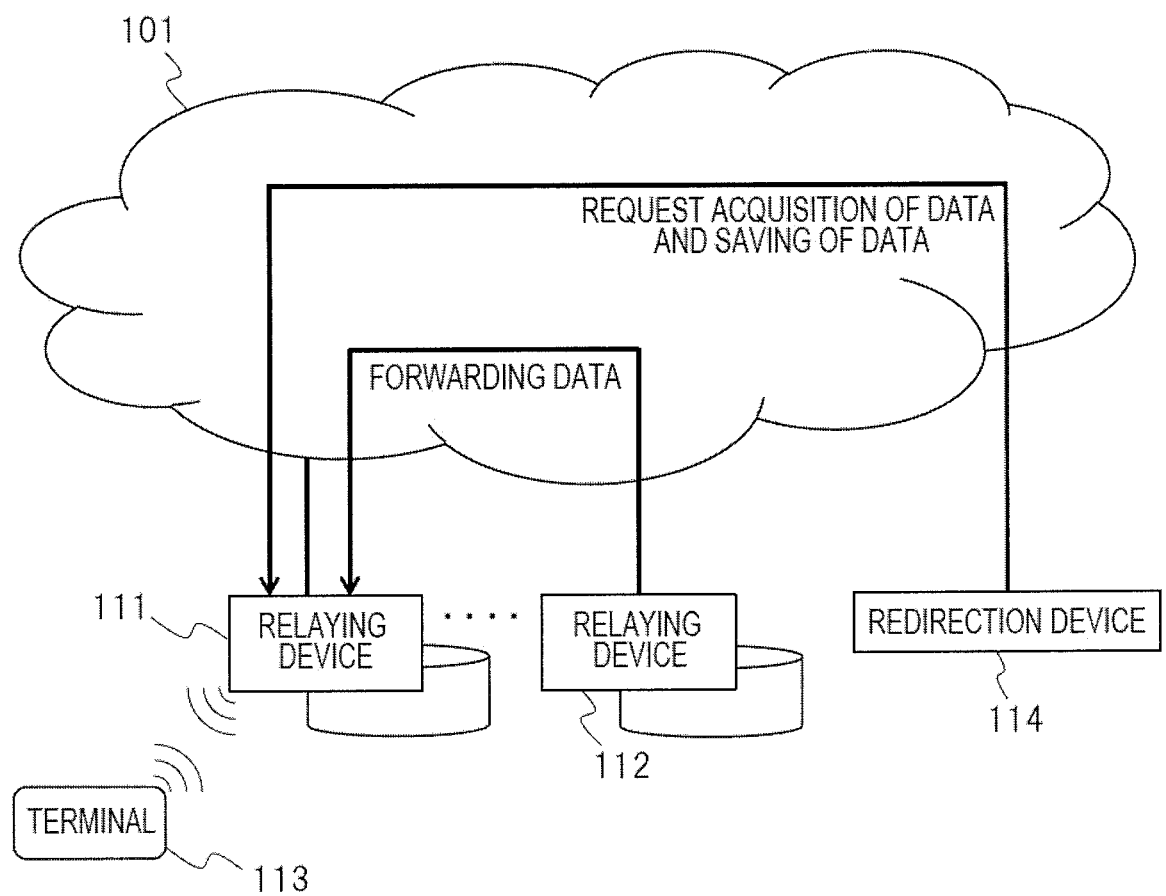
FIG. 6 is a diagram illustrating an example of a management database.
FIG. 7 is a diagram illustrating an examples of data copy or data move operations.

The management database can include management identifiers and information that indicate whether the data unit is stored or not. In this case, only the information that indicates whether a specific data unit is stored or not will be saved for each data unit. It is also possible to manage combinations including the identifier for the relaying device, the data management identifier, and the reference counts. The number of reference counts corresponds to the number counts the data acquisition was requested by the terminal 113 (user). An example of the management database is illustrated in FIG. 6.

It is possible to confirm whether the data unit is stored or not by actually inquiring each relaying device. As long as it is confirmed that the requested data unit is stored in either of the relaying devices within the scope of management, any method can be employed.

The determiner 15 refers to the management database and determines whether the target data unit is stored in any of the relaying devices within the scope of management (step S202). If the data unit is stored in a relaying device which is connected to terminal 113, a redirection response to the relaying device is sent and the reference count corresponding to the data unit is incremented by one. The above explanation is the case when the data unit is not stored in the relaying device which is connected to terminal 113. The data unit is stored in the k-th relaying device.

If the target data unit is stored in the k-th relaying device (YES in S202), it is confirmed that whether the reference count of data unit in the relaying device (here, the i-th relaying device) which is connected to the terminal 113 is exceeding the threshold value "h" (S203). The number of times the data unit "j" is referred by the i-th relaying device is described as the reference count [i][j]. It should be noted that the reference count is the total counts of reference by all the terminals (users), not the counts of reference made by a specific terminal (here, the terminal 113).

If the reference count [i][j] exceeds the threshold value "h," the target data unit is copied from the k-th relaying device to the i-th relaying device (S204). The same data unit as the target data unit stored in the k-th relaying device is generated and saved to the i-th relaying device which is connected to the terminal 113. Specifically, the i-th relaying device is instructed to acquire the data unit from the k-th relaying device and save the data unit which is acquired. The data units can be moved instead of being copied. Decision of whether copying or moving shall be done is made based on parameters such as the size of the target data unit, the increase of the reference count, and the time of last update. These parameters may be added and managed by the management database described above.

FIG. 7 illustrates an example of data copy or move from the k-th relaying device to the i-th relaying device. In this example, the k-th relaying device corresponds to the relaying device 112, and the i-th relaying device corresponds to the relaying device 111. The redirection device 114 instructs the relaying device 111 to acquire the data unit from the relaying device 112. The relaying device 111 sends a data acquisition request to the relaying device 112. The relaying device 112 copies or moves the requested data unit to the relaying device 111.

The redirection device 114 selects the i-th relaying device as the relaying device the terminal 113 acquires the target data unit. In the flowchart of FIG. 5, by substituting the value of "i" into "k," the k-th relaying device is selected as the relaying device the terminal 113 acquires the target data unit (S205).

If the reference count [i][j] does not exceed the threshold value "h", the target data unit is not copied or moved (NO in S203) and the flow proceeds to S206. If it is determined in step S202 that the target data unit is stored in the i-th relaying device connected to the terminal, copying of moving of data units is not necessary.

The redirection device 114 sends a redirection response to the terminal 113. The redirection response instructs redirection to the k-th relaying device (S206). The symbol "k" here refers to "k" updated by substituting the value of "i" when the decision, "YES" was made in step S203. If the decision, "NO" has been made in step S203, the symbol "k" refers to the "k" of the k-th relaying device that has been specified in step S202.

If the terminal 113 is instructed to make a redirection to another relaying device which is different from the currently connected relaying device, the terminal 113 can enter the coverage area of the other relaying device. Then, the terminal 113 can connect to the other relaying device, and then send a data acquisition request to the other relaying device. The terminal 113 can also send a packet (information acquisition request) with the destination address assigned to the relaying device that the terminal 113 has been instructed to make the redirection, to the currently connected relaying device. The currently connected relaying device forwards the packet via the network 101 to the relaying device the terminal 113 has been instructed to make the redirection. The relaying device the terminal 113 has been instructed to make the redirection sends the requested data unit to the relaying device the terminal is currently connected to through the network 101. The relaying device the terminal is currently connected to then sends the data unit to the terminal.

If the target data unit is not stored in any of the relaying devices managed by the redirection device 114 (NO in S202), the redirection device 114 determines whether the reference count [i][j] of the data unit in the relaying device connected to the terminal 113 which transmitted the data acquisition request is exceeding the threshold value "p" (S207 in the flowchart on the right side of FIG. 5). The threshold value "p" may be greater or smaller than the threshold value "h" or may be the same value as the threshold value "h".

If the reference count [i][j] exceeds the threshold value "p" (YES in S207), the redirection device 114 determines the relaying device to save the data unit (S210). Details of the steps will be described later. If the relaying device to save the data unit is determined (here, the determined relaying device is assumed to be the k-th relaying device), the redirection device 114 sends the data acquisition request and the data saving request to the k-th relaying device (S211). Then, the redirection device 114 sends a redirection response instructing the terminal 113 to make a redirection to the k-th relaying device (S212). The reference count [k][j] of the data unit respect to the k-th relaying device is incremented by 1 (S212).

If the reference count [i][j] does not exceed the threshold value "p" in step S207 (NO in S207), the redirection device 114 can acquire the target data unit from the origin server 303, and sends a response including the acquired data unit to the terminal 113 (S208). In other words, the redirection device 114 acts as a simple proxy. The acquired data unit is not saved in any of the relaying devices. The redirection device 114 increments the the reference count [i][j] of the data unit respect to the i-th relaying device to which the terminal 113 is connected by one (S209).

Figure 8:
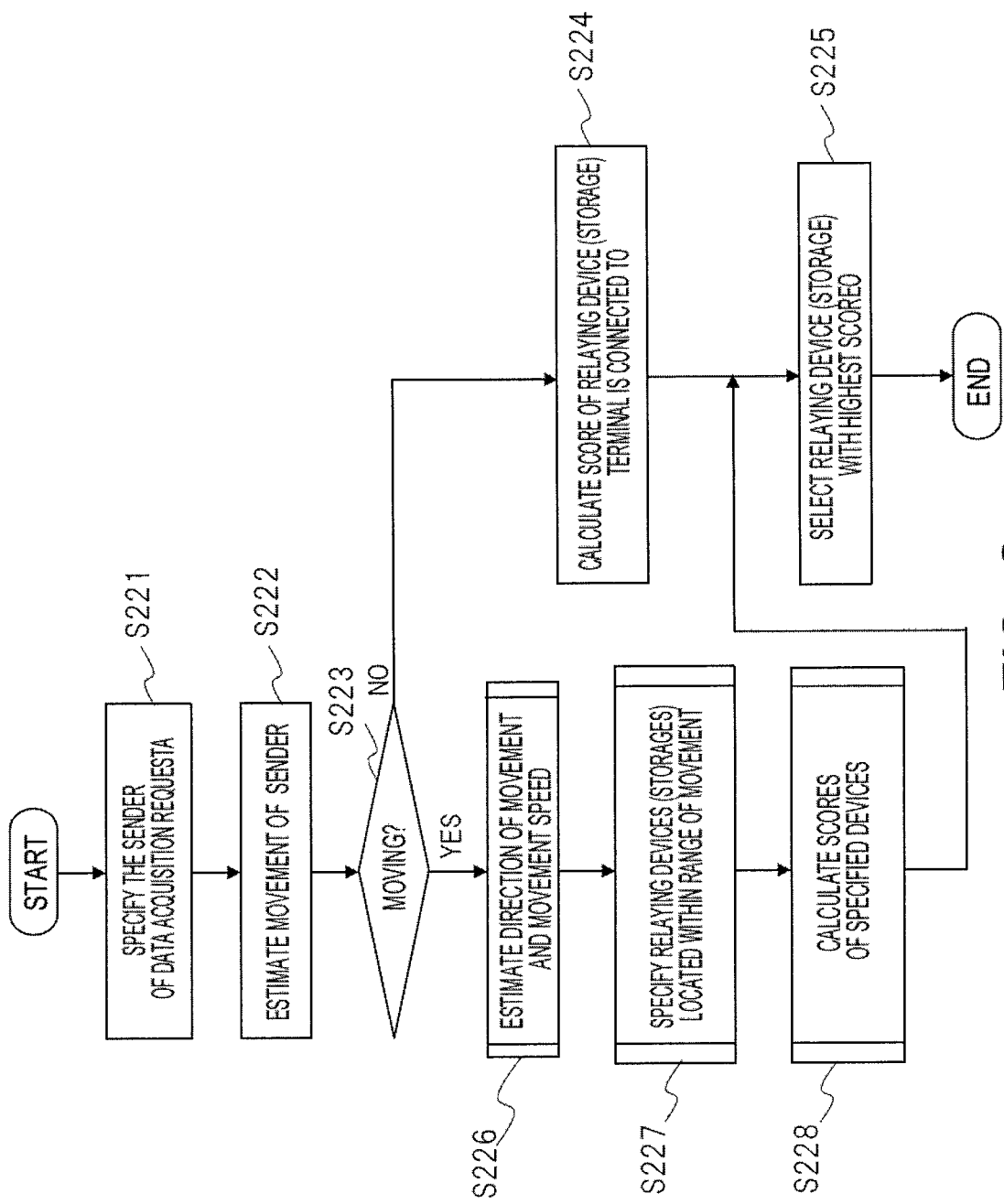
FIG. 8 is an operation flowchart of a task selecting a relaying device serving as the location of storage for data.

FIG. 8 is a flowchart describing how the redirection device 114 to selecting the relaying device where the target data is saved (details of step S210 in FIG. 5).

To execute the operation of this flow, the redirection device 114 holds scores which are used to determine whether it is possible to save data units in a relaying device or not. The score is determined based on the current status of the relaying device, the network status (e.g., at least either the wireless network leading to the terminal or the network 101), and the status of the storage device (basic score). It is also possible to calculate a score based on the state of the terminal and the service used by the user (terminal score). The scores can be calculated based on the characteristic information or the like described above. In this algorithm, the relaying device having the highest basic score or terminal score is selected as the location to save the data unit. The scores described in the following description refer to basic scores or terminal scores depending on cases. The algorithm will be described below.

First, the redirection device 114 specifies the sender of the data acquisition request which has been received (S221). This can be done by, by referring to the transmission source IP address in the packet of the data acquisition request, for example. Here, it is assumed that the terminal 113 was identified as the sender. Next, the redirection device 114 uses the information regarding radio wave sent by the terminal 113 to determine the status of movement for terminal 113 (whether it is moving or at rest; If the terminal 113 is moving at a speed lower than the threshold, the terminal 113 can be regarded as, being at rest) (S222). If it is determined in step S222 that the terminal 113 is at rest (NO in S223), the score of the relaying device the terminal 113 is connected is calculated (S224). If the number of relaying devices the terminal 113 is connected to is assumed to be one, the calculation of the score can be skipped. Then, it is possible to proceed to step S225.

The redirection device 114 selects the relaying device with the highest score and returns information indicating relaying device selected by this algorithm (S225). If the calculation of score is omitted in step S224, or when the number of relaying devices the terminal is connected is assumed to be one, information indicating the relaying device the terminal is currently connected to may be returned.

If the redirection device 114 determines that the terminal 113 is moving (YES in S223), the redirection device 114 measures the direction of movement and the speed of the terminal 113 (S226). Then, the range of destination within a certain period is estimated from the measured direction of movement and speed. Then, the relaying device located in the range of destination is specified (S227). In this example, the coverage area of the relaying devices located within the range of destination is greater than the range of destination with some margin. Therefore, it is very likely that the coverage area of the relaying device include the terminal's range of destination. A terminal located in the range of destination can be connected to any of the relaying devices that exist within the range of destination. One of the relaying devices existing in the range of destination may be the relaying device the terminal 113 is currently connected. One relaying device or a plurality of relaying devices can be specified in step S227.

The redirection device 114 may select the currently connected relaying device when there are no relaying devices located within the range estimated as the destination of movement.

Collection of the information necessary for assuming whether the terminal is moving or not and the actual prediction of whether the terminal is moving or not can be performed by the relaying device or a management device (not shown) that manages the relaying device, instead of the redirection device 114. In this case, the relaying device or the management device may perform the prediction periodically, or may predict based on an instruction from the redirection device 114.

The redirection device 114 can also determine whether the terminal is moving or not each time a data acquisition request is received, or each time a specific condition is met. The condition here may be elapsing of specific time or a specific value of communicated data, for example. Also, decisions can be made when a specific event is detected in a specific relaying device. For example, if the condition is "having connections with a specific relaying device," the prediction of destination or the range of destination for the terminal is done only from the information collected by the specific relaying device. It is possible to determine the destination of movement only within the vicinity of the location where the traffic (such as a route) branches.

The redirection device 114 calculates the scores for one or a plurality of relaying devices that have been specified in step S227 (S228).

The redirection device 114 selects the relaying device with the highest score and returns information indicating the relaying device that is selected by this algorithm (S225).

<Determination Algorithm: How to Calculate the Scores (1)>

The calculation of the scores in steps S228 and S224 of FIG. 8 (flowchart) (calculation method (1)) will be explained here. For calculation of the score, characteristic information described in the explanation of "Information Collected by the Redirection Device 114 and the Information Collecting Method" is used. The functions described below are also used. The redirection device 114 can calculate the score each time the algorithm in the flowchart of FIG. 8 is executed (in this case, the values in the characteristic information are updated every time the algorithm is executed). Calculation may be done in intervals that are independent from of the execution of this algorithm. The calculation results can be stored in a memory or the like. In the latter case, in steps S228 and S224, the score that has been calculated may be read from the memory or the like.

The workload of the j-th relaying device is defined as the function, $f_{LOAD}(\ )$. In this function, the score decreases monotonically with the increase of workload. For example, the function $(1/x)$ which is inversely proportional to the workload can be used. The minimum value of the range is defined as zero.

The characteristics of the wired LAN between the i-th relaying device within the scope of management and the j-th relaying device (where i≠j) which is the target of score calculation (specifically, the total characteristic scores of the wired LAN between the j-th relaying device and all the other relaying devices within the scope of management) is defined as; $\Sigma f_{LANij}(x_1, x_2)$, where $x_1$ is the average throughput and $x_2$ is the average RTT.

In the function above, the score increases monotonically if the average throughput increases and decreases monotonically if the average delay increases. For example, the function can be defined as the linear function $ax_1+bx_2+c(a>0, b<0)$. The minimum value of the range is defined as zero.

The characteristics of the wireless network (wireless LAN, etc.) that the j-th relaying device which is the target of score connects can be defined as the function; $f_{WLANj}(y_1, y_2, y_3, \ldots)$, where $y_1$ is the average throughput, $y_2$ is the Average RTT, and $y_3$ is the Average error rate.

In the function above, the score decreases monotonically if the average throughput increases and the score increases monotonically if the average delay and the average error rate increase. For example, the function, $(by_2+cy_3+d)/ay_1+e$ ($a>0$, $b>0$, $c>0$) which is inversely proportional to the average throughput and proportional to the average delay and the average error rate can be used. In this function, the minimum value of the range is defined as zero. Although the function above has three arguments, there may be more arguments if the information corresponding to other parameters can be collected. Also, functions with a fewer number of arguments can be used.

The characteristics of the storage device in the j-th relaying device which is the target of score calculation is defined as; $f_{STORAGEj}(z_1, z_2, z_3, z_4 \ldots)$, where $z_1$ is the usage of the storage device (the ratio of the storage space that is used to store information and the total storage space of the device), $z_2$ is the total size of written data (in bytes) to the storage device, $z_3$ is the average number of rewrites for non-volatile cells constituting the storage device, and $z_4$ is the average read error rate of non-volatile cells constituting the storage device.

In the function above, the score decreases monotonically if either of the parameters (i.e., usage, total writes, average rewrite count, and average read error rate) increases and the score becomes zero if the value of either parameter exceeds the threshold value corresponding to the parameter.

Linear functions like the example shown below can be used.

$az_1+bz_2+cz_3+ \ldots +d$ ($a<0$, $b<0$, $c<0$) (if $z_1<T_1$, $z_2<T_2$, $z_3<T_3$)

0 (if $z_1 \geq T_1$ or $z_2 \geq T_2$ or $z_3 \geq T_3$; in cases when the expression above takes negative values)

The final score S[j] is defined as shown below using the four functions and the offset $\alpha$.

$S[j]=\{f_{LOAD}(j)+\Sigma f_{LANij}(x_1, x_2)+f_{WLANj}(y_1, y_2, y_3, y_4, \ldots)+\alpha\} \times f_{STORAGEi}(z_1, z_2, z_3, \ldots)$ From the definitions of the functions, the range of the final score S[j] is a real number equal to or greater than zero. The redirection device 114 holds the value calculated from the expression shown above as the basic score. As mentioned, the basic score can be updated if the predetermined condition is met.

(Additional Explanations for the Characteristics of Wired LAN (Network 101))

Additional information on the function $f_{LAN}(\ )$ described above is provided here. The function $f_{LAN}(\ )$ takes the communication characteristics between the relaying device the terminal which sends the data acquisition request is connected and the relaying device which is the target of score calculation (also the candidate location for storing data) as arguments. When data is copied or moved between the relaying devices in step S204 of FIG. 5, the data is forwarded using the LAN. The higher the throughput of the LAN is, and the smaller the RTT is, the more suitable it is for transferring data. Although the throughput and the RTT are used in the example above, functions using other parameters that indicate whether the route is suitable for data transfer or not (i.e., parameters indicating communication characteristics) can be used.

(Additional Explanation on Characteristics of the Wireless LAN)

Additional information on the function $f_{WLANj}(\ )$ mentioned above is provided here. The function $f_{WLANj}(\ )$ represents the condition of communication in the wireless LAN network provided by the relaying device "j" (conditions of channel quality, characteristics of transmission, etc.). For example, the average throughput is a value calculated by taking the average throughputs of all the terminals connected to the relaying device. The greater the value of this parameter becomes, the more likely that data or information can be transferred in higher speeds, for the wireless LAN network. Also, it can be determined that, for the terminal directly connected to the relaying device, it is more useful to use the storage device of this relaying device. Also, the greater the value of this parameter becomes, the less desirable it is to have new terminals connecting to the relaying device.

The conclusions above apply to the average RTT and the average error rate as well. The smaller the values of these parameters are, the less congested the network is. If there is less congestion, a better quality of communication can be expected. When these values are small, it can be determined that it is better to use the storage device for the terminal connected directly to the relaying device.

Although three parameters were used in the description above, other parameters that can represent the quality of the wireless LAN network (state of channel quality or the characteristics of transmission) may be used. When other parameters are used, the function can be defined so that the score takes smaller values when the quality of communication on the wireless LAN network improves. The score takes higher values when the quality of communication become poorer.

It is possible to define the function $f_{WLANj}(\ )$ with the opposite features as the description above. The function can have higher scores when the quality of communication for the wireless LAN network is good. The score takes lower values when the quality of communication is poor. The advantage of using such a function is that the terminal can download data in an optimal network environment, from the relaying device located within the range of movement. However, if a plurality of terminals concentrates, the wireless LAN network environment may be affected.

<Determination Algorithm: How to Calculate the Scores (2)>

A method for calculating a score (calculation method (2)) which is different from the aforementioned method (1) will be described below. According to method (1) described above, the function $\Sigma f_{LANij}(x_1, x_2)$ of the wired LAN section was obtained by measuring the communication characteristics between the relaying devices and calculating the sum. According to this method, decisions are made based on information that can be measured in the wired LAN ports of the target relaying devices, I/O status of the storage devices, and forwarding status of the target relaying device. Hence, it is not necessary to measure the communication characteristics between the relaying devices. The function $f_{LOAD}$ (j), the function $f_{WLANj}(y_1, y_2, y_3, y_4, \ldots)$ and the function $f_{STORAGEi}(z_1, z_2, z_3, \ldots)$ are the same as the functions defined in method (1).

The characteristics of the wired LAN for the j-th relaying device which is the target of score calculation is defined as; $f_{LANj}(x_1, x_2, x_3, x_4, x_5, x_6)$, where $x_1$ is the data transmission throughput of the wired LAN, $x_2$ is the data receiving throughput of the wired LAN, $x_3$ is the data transmission throughput of the wireless LAN (the sum if multiple interfaces exist), $x_4$ is the data receiving throughput of the wireless LAN (the sum if multiple interfaces exist), $x_5$ is the reading throughput of the storage device, $x_{5W}$ is the reading throughput of the information to be transmitted to the wireless LAN, $X_{5L}$ is the reading throughput of the information to be transmitted to the wired LAN, the relationship $x_5=x_{5W}+x_{5L}$ holds, and $x_6$ is the writing throughput of the storage device.

For example, a linear function, $ax_{5W}+bx_{5L}+c$ (a>0, b<0) can be used. The minimum value of the range is defined as zero.

Figure 9:
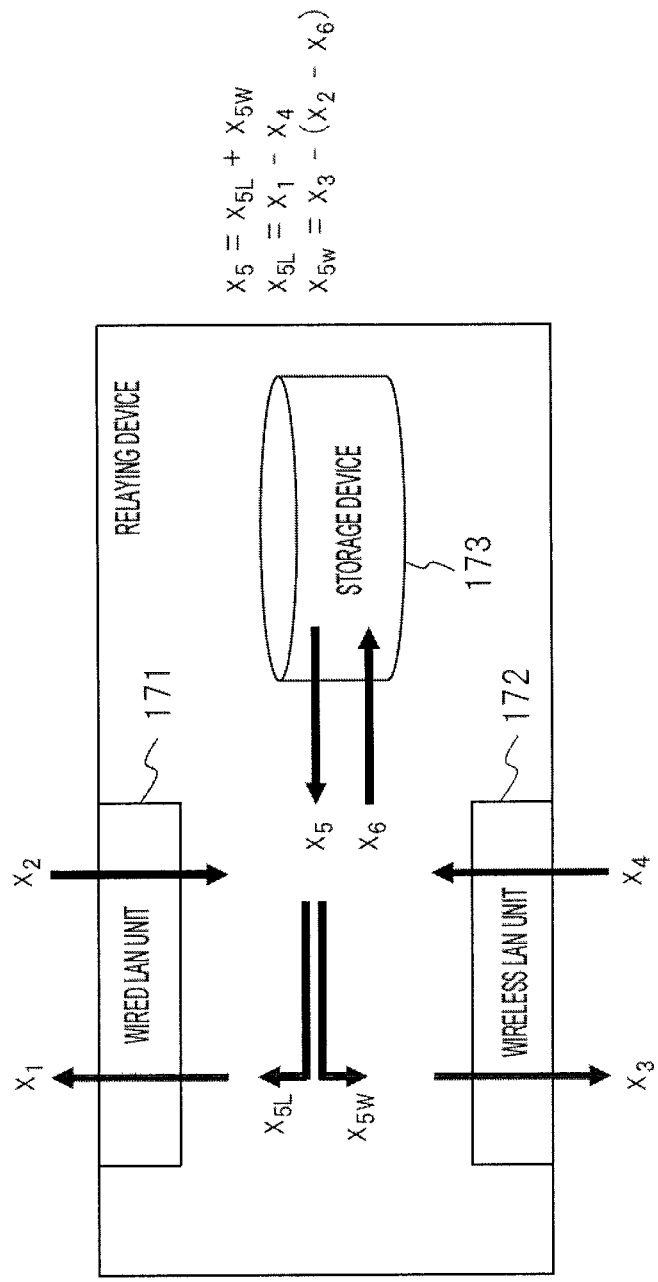
FIG. 9 is a diagram illustrating an example of a score calculation method.

When the values of "$x_{5W}$" and "$x_{5L}$" can be measured directly, the score may be calculated using the values (e.g., the flow of communicated data is defined based on the transmitting IP address and the receiving IP address, and the storage I/O can be measured using the data flow). However, when "$x_{5W}$" and "$x_{5L}$" cannot be measured directly, they can be calculated using the parameters "x1" to "x4", respectively FIG. 9 is a diagram for explaining method (2). A storage device 173, a wired LAN unit 171, a wireless LAN unit 172, all provided in the relaying device, and parameters (throughputs) "x1" to "x6" are shown. According to FIG. 9, "$x_{5W}$" and "$x_{5L}$" can be calculated by using the equations; $x_{5L}=x_1-x_4$ and $x_{5W}=x_3-(x_2-x_6)$.

Here, the throughputs, "x1" to "x4" each include some traffic of control signals or the like which are not related to the I/O of the storage device. However, they are ignored because the traffic of control signals is usually smaller compared to the data traffic. However, values obtained by subtracting the traffic of control signals from the total traffic can be used for calculating the throughput. In this case, information such as the transmitting IP address, the receiving IP address, the communication protocol, the transmitting/receiving port numbers, and the like can be used.

Calculation of $f_{LANj}(\ )$ according this method can be completed only with the information acquired from a single device (the relaying device which is the target of score calculation). Thus, by using method (2), the overall calculation process will become simpler compared to method (1).

<Additional Explanation on Workload>

Additional information on the function $f_{LOAD}(\ )$ will be explained here. The function $f_{LOAD}(\ )$ is assumed to be decreasing monotonically respect to the workload. It is considered that relaying devices with high workloads are already providing data or information to many terminals. Therefore, the scores for relaying devices whose workloads are relatively light are calculated first. As described above, the workload can be defined as the processing workload of the CPU, for example. The workload can also be defined as the number of connected terminals. In such a case, this function can be defined using the number of connected terminals. Furthermore, this function can be defined using both the CPU workload and the number of connected terminals.

<Additional Explanation on the Characteristics of the Storage Device>

Additional information on the function $f_{STORAGE}(\ )$ described above will be provided. The average rewrite count of the non-volatile cells, the average read error rate, the usage of the storage device (the ratio of the capacity used to store the information and the total capacity of the device) and the total writes are used as the arguments of the function $f_{STORAGE}(\ )$. These four parameters are used when NAND flash memory are used as storage elements.

Due to the characteristics of NAND flash memory, there is an upper limit to the number of rewrites. Therefore, the use of memory cells that have been rewritten many times should be avoided. In general, the imbalance in the rewrite counts among the memory cells in a single storage device is disguised by the NAND controller. However, extended lifetime of the whole system can be expected by operating the relaying devices so that, imbalance in the number of rewrites between the storage devices are reduced. For example, as indices of degradation, the total amount of data written or the average rewrite counts for the respective cells may be used to mitigate the imbalance among the relaying devices. Regarding the total amount of data written, the redirection device 114 as a single device can recognize the approximate amount of data written (it can be calculated using the content size information included in either the received request or the response). However, information on the number rewrites need to be obtained from the storage device within the relaying device, itself.

Similarly, the read error rate is also an index that indicates the lifetime (degree of wear) of the memory cells. A higher read error rate indicates that the performance of the memory cells is degraded. By avoiding concentration of rewrites to a specific storage device, it is possible to delay the increase of read error rates, extending the lifetime of the whole system. The process of avoiding memory cells exhibiting high read error rates while writing data is disguised within in the storage device. Due to reasons mentioned above, in the function $f_{STORAGE}(\ )$, if at least one of the two parameters increase, the score needs to decrease monotonically.

In the example mentioned above, the NAND flash memory was used as the storage element. If other storage elements are used, functions can be defined similarly, as long as there are parameters which can be used. When the corresponding parameters are introduced to this function, it is determined whether the data writes have positive or negative impact to the lifetime of the storage device. According to this evaluation, the coefficients of the parameters are determined according to the degree of positive or negative impact. If the number of rewrites does not affect the lifetime of the storage device, this function may be designed based solely on the usage of storage device.

<Determination Algorithm: Predicting the Direction and Speed of Movement>

In order to predict the direction and speed of movement of the terminal 113 in step S226 of FIG. 8, the arrival angle of the radio wave received by the relaying device, the arrival time (or the time difference of the arrival times of the incoming radio waves), change in intensity of the radio waves, or the like are used, for example. Such information is collected from the relaying device or the management device which manages the relaying device. Information is obtained respect to each terminal or each group of terminals. To collect information in units of groups, the predicted direction and speed of movement or the like for the group including the terminal 113 is specified. The relaying device stores the information that is collected to the storage device within the relaying device or some other storage device. The relaying device may send the information that is collected to the redirection device 114. Then, the redirection device 114 can analyze the information to predict the direction and speed of terminal 113. In another method, the redirection device 114 can send a request for analyzing information to an external server or the like, after the redirection device 114 collects information from the relaying device. The redirection device 114 can then receive the result of analysis from the external server or the like. The redirection device 114 can also collect the analyzed information from the relaying device or the management device. The analyzed information includes the (relative/absolute) position, the direction of movement, and the speed of movement regarding the terminal(s), for example.

<Determination Algorithm: Selecting the Relaying Device Group>

Additional explanations will be given below, regarding the selection of a plurality of relaying devices within the range of movement for the terminal 113 in step S227 of FIG. 8. The selected plurality of relaying devices is referred to as the relaying device group. As described above, the direction and speed of movement for the terminal 113 can be calculated by using conventional methods. The redirection device 114 has information on the logical topology of the wireless network, including the relaying devices and the physical location of each relaying device. Based on the information of the logical topology, the redirection device 114 identifies the group of relaying devices within in the terminal's range of movement.

The range of movement can be calculated, as the range where the terminal 113 exists after a certain period, for example. (for example, the period needed to download data is one candidate) This period can includes certain measurement errors for both the direction of movement and the speed of movement. Here, the range of movement is specified by using the direction and speed of movement, etc. The redirection device 114 can record the movement of the user for terminal 113. By using the record, the range of movement for the user can be specified. It is possible to specify the user's range of movement by using methods other than those described herein.

Information on the logical topology of the wireless network and the physical location of each relaying device may be preconfigured by the owner of the network or the network administrator. Alternatively, features that recognize the logical topology of the wireless network automatically can be provided. For example, features that enable the detection of physical positions of the relaying devices such as GPS can be provided. If the operation is performed automatically, the information collector 13 of the redirection device 114 uses communication protocols to collect information from relevant devices (e.g., other relaying devices, GPS, and the like).

<Determination Algorithm: Determining the Location of Storage using the Determined-First-Method>

In the method described below, redirection device 114 determines the location to store data and forwards the data to the corresponding location, before receiving the data acquisition request (determined-first-method). The redirection device 114 collects characteristic information (described in the section "Information Collected by the Redirection Device 114 and the Information Collection Method") using similar methods as the determined-later-method (determines the location to store data when the data acquisition request is received). The characteristic information which is collected can be updated periodically considering the accuracy of information. Also, it is possible to limit the retention period of the characteristic information to a certain period (e.g., age of five minutes or the like).

The redirection device 114 obtains lists of data units stored in each relaying device periodically (the data itself can be obtained in this stage). The redirection device 114 determines the relaying device as the location to store data units based on the list and the characteristic information of the network and the storage device, or the like, which has been already collected. Several methods can be used to determine the location to store data units. Examples of determining the locations in this embodiment will be described below.

Example 1

Locating Data in Places where Multiple Wireless LAN Users Concentrate

According to the first method, the relaying device with a greater number of connected terminals (number of users) is determined based on the characteristic information that has been already collected (the state of the wireless network the relaying device is connected directly (average throughput, average delay, average error rate, etc.)). More data units are located to the determined relaying device (the data units can be saved).

For example, if N data units are assigned to M relaying devices, the redirection device 114 determines the number $S_i$, which is the number of data units to be saved in each relaying device, depending on the number of users $U_i$ for each relaying device. The index "i" corresponds to each relaying device. If multiple copies of the same data units are not saved to the relaying devices, the relationship $\Sigma S_i = N$ holds.

For example, the redirection device 114 can select a data unit randomly from the N data units for the relaying device with the greatest number of users. Then, the redirection device 114 can save the selected data unit to the relaying device with the greatest number of users. The above selection and saving of data units is repeated there is no free storage space in the relaying device or until the consumed storage space within the relaying device reaches a threshold value. When operation is completed, the same task is performed for the relaying device with the next greatest number of users. In the stage when all the N data units are stored in the relaying devices, the task is finished.

The list of data may include information on popularity of data unit. In the example described above, $S_i$ data units were selected randomly. If the data units with the highest popularity are stored first, data units with higher popularity will be stored in relaying devices with more users. By adopting the aforementioned policy based on popularity, it is more likely that the requested data unit is available in the relaying devices. Thus, it is possible to avoid increased access to the CDN cache servers and the origin servers located in the upstream of the relaying devices.

However, if the order of popularity and the priority of selection for the relaying devices (the relaying devices with the greatest number of users have the highest priority) are fixed, workload may concentrate to a specific relaying device. Therefore, it is possible to combine both random selection and selection based on popularity.

Specifically, the selection of data units to be stored is treated as probabilistic events based on the popularity and the number of users. For example, it is determined whether some data units to save in the relaying device with a large number of users should be selected or not. Then, data units with higher popularities are more likely to be selected and data units with lower popularities are less likely to be selected. On the other hand, for relaying device with smaller numbers of users, data units with higher popularities are less likely to be selected and data units with lower popularities are more likely to be selected.

According to the method above, it is possible to avoid situations where certain relaying devices always store specific data units with high popularities. As a result, the overall workload of the whole system is balanced.

In the example explained above, multiple copies of the same data unit were not saved in different relaying devices. However, it is possible to save multiple copies of the same data unit to different relaying devices. If necessary, the same data unit can be duplicated and stored in a plurality of relaying devices. In such cases, the relationship $\Sigma S_i > N$ (i=1, ..., M) holds. In order to ensure that all the data units are stored in some relaying device, $S_{i\_min}$ (where $\Sigma S_{i\_min} = N$ (i=1, ..., M)) data units are stored first, not allowing duplication of the same data in a single relaying devices. Then, the data units are stored in relaying devices with sufficient storage space.

Additional Items for Example 1

Concentrating data units to relaying devices with a large number of users enables efficient distribution of data. However, in order to concentrate data, storage devices with large storage spaces are needed. If the size of data (size of information) can be reduced in the application layer, the requirement for storage space can be alleviated.

For example, it is possible to store only a part of the target data unit. It is also possible to increase the compression ratio, thereby reducing the size of data. Below, a case when video data is saved is explained. Since saving the whole video consumes storage space, only the beginning or highlights of the video is stored. In order to do this, distributing the video as a plurality of fragments is effective. By modifying the meta-data used for controlling the distribution, it is possible to save only a part of the data unit. In the meta-data, the source information of the stored part is set to the corresponding relaying device. The source information of the remaining part is left unchanged and set to the upstream servers (origin servers or CDN cache servers, etc.). The part of the data not stored in the relaying device, can be forwarded from the origin server or the CDN cache server, as in conventional systems. The redirection device 114 can send the meta-data for controlling distribution of data to the terminals instead of redirection responses. The terminals can send an acquisition request for only part of video corresponding to the meta-data, not the whole data unit. The relaying device that has received the acquisition request may acquire the part of video data corresponding to the meta-data.

The quality (bit rate, resolution, etc.) of the video that is stored can be changed according to the status of the wireless network. For example, when there are a large number of users requesting different videos, video data encoded at a lower bit rate is stored. If the number of users is smaller, or when the number of requested videos is small (when it can be anticipated that the requested video will concentrate to a specific content), a video encoded at a higher bit rate is stored. The control described above can be done by modifying the meta-data of video distribution (the redirection device 114 notifies the terminal that videos with specific quality level are acquired by the relaying device and the other videos are acquired by the upstream servers).

The example described above was based on different factors including the number of users, the number of requests or difference of requests. However, a combination of the aforementioned factors or other factors can be used to find the trade-off between the number of data units that is stored and the quality of service that is provided.

Arrangement Example 2

Arranging Data in Accordance with the User's Direction of Movement Among Relaying Devices The relaying device distributes data (content, etc.) to terminals located within scope of coverage (scope of transmission for the radio waves). If the user is moving, the terminal also moves away from the relaying device. Then, the relaying device turns out to be an inadequate source of data acquisition for this terminal.

In order to handle cases described above, the redirection device 114 can allocate data requested from the user (terminal) or a plurality of data fragments which are obtained by dividing a data unit, to each of the relaying devices. The action of individual users can be recognized to find the overall trend of movement. The trend of movement for a group of users can be also recognized. When recognizing the movement of individual users, conditions such as filtering subscribers who have a special service contract can be applied. If a group of users is recognized, a group with certain characteristics such as a group of users moving in the same direction, a group having common attributes such as age, gender, affiliation, types of terminals that are used or the like can be used as the criteria. Also, a group of users requesting the same data (contents) within a certain period, a group of users who accessed data located in a certain area in the past X days, or the like can be used as the criteria, as well.

User information (user name and other information) used when the terminals connect to the wireless network, and the access history of relaying devices can be used to find the trend of movement of the users or a group of users. The redirection device 114 can obtain such information from each relaying device. The direction and speed of the users can be determined based on the arrival angle, arrival time, or the like of the radio waves received by the relaying devices. When the relaying device receives a request from the redirection device 114 and recognize the status of the users (terminals), the redirection device 114 can specify a terminal. Then, the relaying device can find the trend of movement of the respective terminal. The relaying device can also recognize the trend of movement for one or a plurality of terminals that is detected within at a certain period after receiving a request from the redirection device 114.

When the user group is specified, the above information is analyzed and the group of users moving in the same direction is detected. The "same direction" used herein refers to the same direction in the same route, or implies that the users are located within a certain angle respect to a specific direction. Definitions besides the examples mentioned above can be used.

More than one group of users can be identified. A plurality of user groups can be identified simultaneously. For example, when there is a plurality of passages heading into a certain building from the entrance, these passages can be identified as different user groups. If there are users with different speeds within a single route, the users can be grouped according to their speed. Then, the direction and the speed are calculated separately for each group of users.

The process of identifying the group of users can be executed by an external server (such as a management device provided in the cloud), besides the redirection device 114. If the external server is used, the redirection device 114 can provide the external server with information necessary for identifying the group of users. The redirection device 114 can also send instructions to the relaying device or the like.

Then, the relaying device receiving the instructions may provide the external server with the information needed for identifying the group of users. The external server can also collect information which is needed independently.

When the group of users is identified, the redirection device 114 specifies the relaying device within the route of the group of users. Then the redirection device 114 instructs the specified relaying device to save the data unit. Since the redirection device 114 has information on the physical position and the logical topology of the network device, it can identify the relaying device located within the estimated route by using the collected information.

When data unit is stored in a plurality of relaying devices within the route of movement, the data unit can be fragmented (divided) and stored in each of the relaying devices. When fragmented data units are stored in a plurality of relaying devices, the continuity of data unit is confirmed. If the size of data unit is large, a fragment corresponding to the head of the data unit is saved in a relaying device located in the beginning (the side which is closer to the position of the current user) of the route. The remaining fragments are stored so that in the relaying devices located in the later parts of the route, the fragments in the tailing parts of data unit are saved. The data unit is distributed by fragmenting large data unit and modifying the respective meta-data. Depending on the locations of the fragments within the data unit, each relaying device modifies the meta-data so that the fragment assigned to the relaying device can be detected and saved. This process can be performed by the redirection device 114 or by the relaying devices. If the distribution method does not support fragmentation of data units, it is also possible to distribute parts of data units using HTTP range specification download. In such a case, each relaying device can store parts of data unit which is assigned to the device but also parts surrounding it. Then, the terminal can compensate parts of data units which cannot be received from the previous relaying device, by acquiring the corresponding section of data unit from another relaying device.

Modification of Arrangement Example 2

In a variation of Arrangement Example 2, it is possible to save data units with higher popularities in relaying devices in the beginning of the route (side closer to the terminal). The deeper it is in the route of movement, the lower the popularity of the data units stored in the corresponding relaying devices become.

Arrangement Example 3

Locations Based on the State of the Storage Device

In the Arrangement Examples 1 and 2, the selection of relaying device to a store data unit was determined without considering the state of storage devices. In this arrangement example, the relaying device to a store data unit is determined based on the state of storage devices. In the non-volatile memory such as the NAND flash memory, the lifetime of the storage device is affected by frequent rewrites. Degradation of the device proceeds with the rewrite counts. Therefore, avoiding the overuse of a storage device that has high rewrite counts helps keeping the lifetime of the whole system longer.

In Arrangement Example 3, it is assumed that a list indicating the period that the data unit is valid (the period the data unit can be saved in the storage device or the maximum interval between cross-checks with the original data) is notified from each relaying device to the redirection device 114. The location of storage is determined by combining this list with methods described in the Arrangement Example 1 or 2. Priorities can be set to relaying devices based on factors that show the degree of degradation in storage devices. For example, the average rewrite count or the total size of data that is written (a higher priorities are set for relaying devices with lower rewrite counts or smaller size of written data). Also, the period that the data unit is valid can be treated as the popularity in methods presented in Arrangement Examples 1 or 2. In such cases, the data units can be sorted so that the data unit with the shortest period of validity comes first. By doing this, data units that have shorter periods of validity, therefore more likely to experience rewrites is stored in relaying devices with a small number of rewrite counts or smaller size of written data. When a plurality of relaying devices exists as candidates of storage locations in Arrangement Example 1 or 2, the relaying device with higher priorities is selected. In the selected relaying device, the data unit is stored.

<Determination Algorithm: Introduction of Scores for the Determined-First-Method>

Scores used in the determined-later-method can be used in the determined-first-method as well. As described during the explanation of the determined-first-method, the redirection device 114 manages the scores of each relaying device based on the characteristic information. As in the determined-later-method, the score may be calculated by using parameters, finding the values of the functions, and getting the sum of the values.

In Arrangement Example 1, data is stored from the relaying devices with the greatest number of users. Therefore, the score can be set so that the more users there are, the higher the score becomes.

In Arrangement Example 2, the "basic score" not including the effect of movement is calculated based on the workload of the relaying devices and characteristics of the network. Then, the "terminal score" is calculated by adding points to the basic score of a specific user or group of users. When the terminal score is calculated, points are added to relaying device located within the route of movement for the corresponding group of users. In Arrangement Example 2, the addition of points can be adjusted based on popularity. The scores of the relaying devices located in the beginning of the route with data units with high popularities are increased, and the scores of other relaying devices are unchanged. When data units are fragmented, adjusted scores can be assigned to each fragment. The characteristics of storage devices mentioned in Arrangement Example 3 can be reflected to the basic score as well.

(Determination Algorithm: Selecting the Location of Storage in the Determined-First-Method)

The location of storage was selected by the redirection device 114 in Examples 1 to 3, but other elements may select the location to save data units. For example, both the redirection device 114 and an external server can cooperate to determine location of storage. The redirection device 114 can collect information, and the information that is collected is used by the external server, accelerating the execution of the determination algorithm. The external server can execute the whole process from collecting information to the selection of the storage location. In such a case, the result is notified to the redirection device 114. When the redirection device 114 receives the data acquisition request from the terminal, it can send a response including the results to the terminal.

<Redirection Device 114: Rearrangement of Data (Determined First or Later)>

Data may be relocated when a certain condition is met, after the relaying device to store data is determined. The relaying device can be selected based on the determined-first-method or the determined-later-method.

The examples of data relocation conditions include the following.

(1) The storage space available in any of the relaying devices under the control of the redirection device 114 becomes insufficient (e.g., available storage space is equal to or less than threshold value).
(2) There is significant change in environmental conditions (e.g., over 10 relaying devices have been connected or disconnected, etc.) since the location of storage for previous data was determined.
(3) A certain period has elapsed (when data is rearranged based on periods such as morning, daytime, evening, midnight, etc.).
(4) A large imbalance in the usage rate among a plurality of relaying devices is detected (e.g., the difference between the maximum usage rate and the minimum usage rate is equal to or greater than the threshold value, etc. The usage rate can be, the number of requests from terminals during a certain period, for example).

Rearrangement can be done according to the determined-later-method or the determined-first-method. Rearrangement can be done for all the data units (contents, etc.) stored in the corresponding relaying device, or may be performed for some of the stored data units.

If the relaying device that the data unit is assigned has been changed due to rearrangement, the redirection device 114 can copy or move the data unit from the current relaying device to the new relaying device. The data unit can be reacquired from the origin server 303.

In the explanation above, the collection of information and the redirection tasks were executed continuously. However, they can be executed independently or in parallel. According to this embodiment, distribution of data in smaller granularities, load-balancing of storage devices and extended lifetime of storage devices can be achieved.

Second Embodiment: Supporting Uploading of Data

In the first embodiment, data download was described. In this embodiment, cases when data is uploaded will be described. The system configuration (network) and the redirection device 114 according to this embodiment, and other device configurations are the same as the first embodiment.

Figure 10:
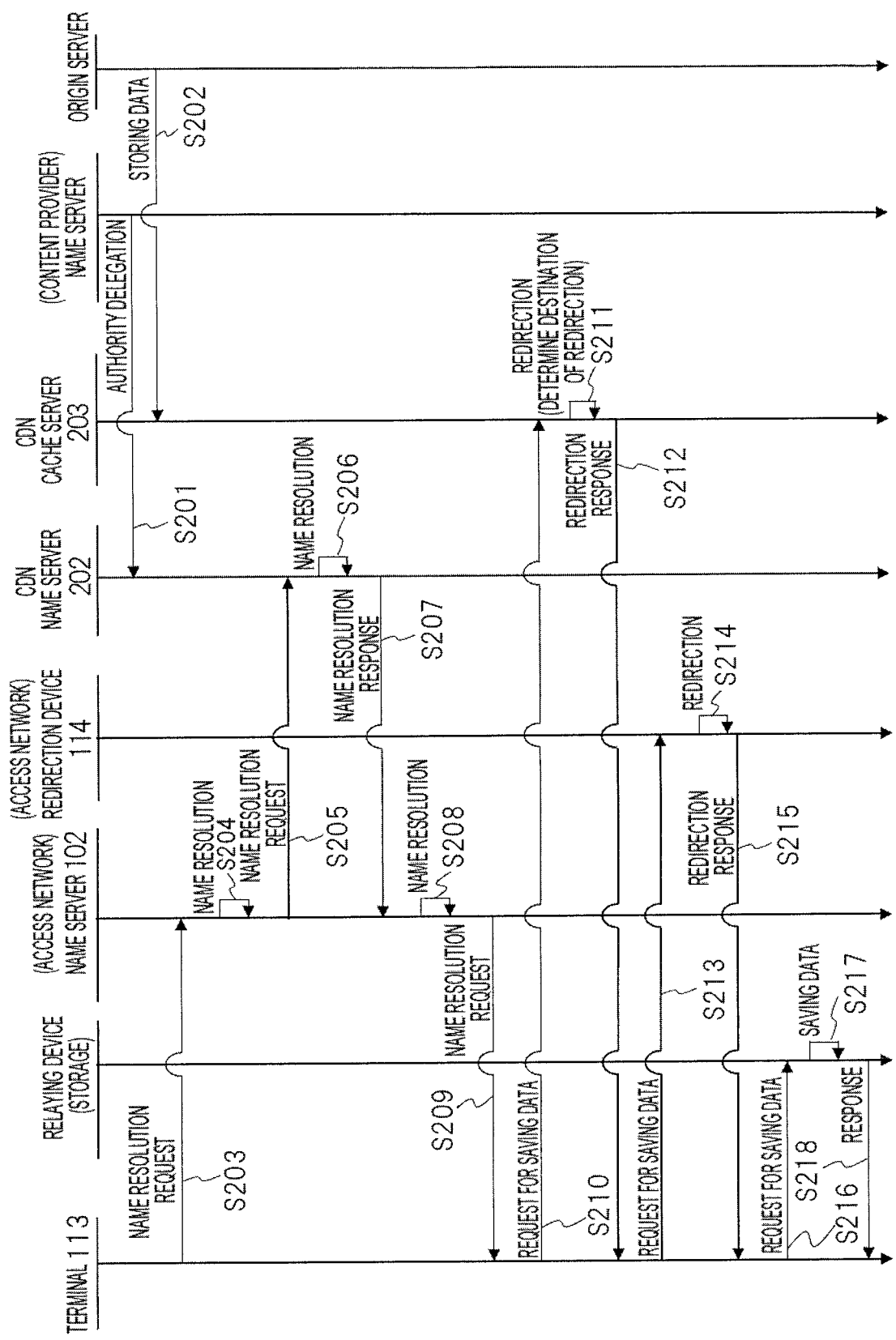
FIG. 10 is a diagram illustrating a sequence to upload data.

FIG. 10 illustrates a sequence for uploading data. This sequence is basically the same as the sequence for downloading data. Steps S201 to S213 in FIG. 10 correspond to steps S101 to S113 in FIG. 3. Steps S201 and S202 are the same as steps S101 and S102 in FIG. 3. The terminal 113 issues a name resolution request and the CDN cache server 203 is specified in the response (S203 to S209). The data saving request (upload request) issued by the terminal 113 is delivered to the redirection device 114 (S210 to S213) according to the redirecting request issued by the cache server 203. The redirection device 114 selects the relaying device which will be the location to save the uploaded data unit (S214). The redirection device 114 sends a redirection response to the terminal 113. The redirection response instructs redirection to the selected relaying device (S215). The terminal 113 sends a data saving request. The data saving request instructs uploaded data unit to be saved in the relaying device specified by the redirection response (S216). The data unit is stored in storage space allocated within the relaying device. When the data unit is saved, the relaying device returns a response notifying that the data unit saving task has been completed to the terminal 113 (S218). After a certain period, the data unit saved in the relaying device is transferred to a server in the external network (the server can be the origin server 303 in FIG. 1) or storage prepared separately. Destination of upload (identifiers) such as the URL can be included in the data saving request. In such a case, the relaying device controls the transfer of data units, so that the data unit is stored in the server which is specified as destination of upload (can be the origin server).

Protection (security) of uploaded data units, transmission of user information used to associate the uploaded data unit to a user, or the like are along with the tasks described in the sequence (not shown). In FIG. 10, the terminal 113 sends the data saving request. And then the corresponding redirection response is transmitted (S212, S215). However, the terminal 113 may send an "upload destination request" to the redirection device 114. Then the redirection device 114 can notify the location (URL) of the storage device as the destination of upload to the terminal 113 in the redirection response.

(Allocating the Location of Storage)

To upload data, storage space within the relaying device needs to be allocated. The redirection device 114 is responsible for allocating the storage space. The relaying device which receives the instruction from the redirection device 114 allocates storage space for saving the data unit (allocation of storage space).

When the redirection device 114 receives a data saving request (upload request) and the redirection device 114 instructs the terminal 113 to redirect a data unit to the desired relaying device, above allocation task begins. Since the redirection device 114 has information on the usage of the storage device in each relaying device, the relaying device having sufficient storage space for the data unit uploaded by the terminal 113 can be determined.

If the size of data unit that is going to be uploaded is known, it is determined whether there is a relaying device having sufficient storage space to allocate the data unit. If the size of data unit is not known, the availability of allocation space can be determined based on general information such as the average size of data units uploaded in the past or the maximum size of data units, which is allowed in the contract.

If the redirection device 114 can make an inquiry to the terminal 113 regarding size of the data unit to be uploaded, the redirection device 114 can send the inquiry for the size of data unit, to terminal 113. If the redirection device 114 can specify one relaying device, the redirection device 114 returns a redirection response with the specified relaying device set to the destination of upload. When a plurality of relaying devices is specified as candidate destinations of upload, the destination of upload is narrowed down to one relaying device.

A specific relaying device can be selected from candidate destinations by using the score described in the first embodiment, for example. Calculation of the basic score can be done similarly to the first embodiment, using the workload of the relaying device, the status of the network, and the space available in the storage device. Basic scores or the terminal scores of relaying devices excluded from the candidates is set to zero. The scores of relaying devices with basic scores or terminal scores greater than zero may be adjusted based on the characteristics of the storage device (total data written or average rewrite count). For example, the score of the relaying device having large values for a specific parameter can be subtracted so that it is more unlikely that this relaying device is selected (such adjustments can be included in the calculation of the basic score). Addition of points (addition of a point to the scores of relaying devices that are connected directly and relaying devices located in the direction of movement) and subtraction of points (subtraction of points from the score of relaying devices that is located remotely from the connected terminal and relaying devices located in a different direction from the direction of movement) can be done based on the location of the connected terminal and the movement of the terminal.

Since scores (basic scores or terminal scores) are compared between the relaying device candidates which are selectable, the desired relaying device can be chosen.

Additions to the First and Second Embodiments: Response to Individuals (Determining the Availability of Individual Users)

The user information of the terminal is managed by the terminal management feature (not shown) of the relaying device. Another way to manage user information of the terminal is by using a central management device that manages a plurality of relaying devices and an authentication server (not shown) which is the back end of the central management device. The management features or management devices handle user information of the wireless network such as the user names and the passwords, and determines whether connection is permitted when a connection request from the terminal is received. The management feature or the management device also manages the encryption keys used for encrypting the frame to be transmitted to the relaying device, by the terminal which has a connection.

When the redirection device 114 in the first and second embodiments handles tasks for individual users, the redirection device 114 acquires the user information of the terminal which is currently connected using the management feature of the relaying device or the management device. For example, the redirection device 114 acquires the user name based on the MAC address or the IP address.

If the provider that manages connections to the wireless network is different from the provider that manages the storage device of the relaying device, the redirection device 114 acquires the information of the wireless network provider (this information is obtained along with the user name (user information), for example). The redirection device 114 specifies the server of the wireless network provider based on the information of the provider and makes an inquiry to the server regarding user information. If the use of the storage device in the relaying device is allowed as a result of the inquiry, the redirection device 114 issues an instruction to the relaying device instructing to allocate space for the user.

Information (e.g., the upper limit of the size of storage space to be allocated, etc.) necessary for allocating space in the storage device can be stored inside the redirection device 114 or each relaying device, either the management device or authentication server (not shown) of the wireless network provider. If the information is stored in the management device or the authentication server, the redirection device 114 can acquire the information along with the result of inquiry for user information.

If the provider of wireless network and relaying device are common, the user information is managed in storage 14 of the redirection device 114 or a management device (not shown) located in the upstream of the redirection device 114. The redirection device 114 checks whether the storage device can be used by referring to the user information acquired from storage 14 or the management device. For example, a database that specifies relaying devices that are available for each user name can be used. If the use of the relaying device is permitted, the redirection device 114 issues an instruction to the relaying device (storage device) to allocate space for the user.

The redirection device 114 can refer to information besides the user information of each user (person) to determine the relaying device to be used. The characteristic information of the user (terminal) can be used, in addition to methods described above. If the terminal score is calculated, the trend of usage for relaying devices by each user can be referred, for example. Additional points may be added to the score so that the score of the relaying device which is frequently used by the user (the relaying device which has frequent access from the terminal) is increased.

Third Embodiment: The Redirection Device 114 with a Storage Device

In the embodiments described above, the redirection device 114 instructed the storage device incorporated (connected internally) in each relaying device to store data which is downloaded or uploaded. The redirection device 114 according to this embodiment includes a storage device and is capable of storing data in the storage device. Therefore, the redirection device 114 can also send data units to the terminal. When the data acquisition request is received from the terminal, the redirection device 114 can read out the requested data unit from its own storage device without having the terminal to make redirections to the relaying device. The redirection device 114 can transmit the requested data unit to the terminal via the relaying device the terminal is connected.

Figure 11:
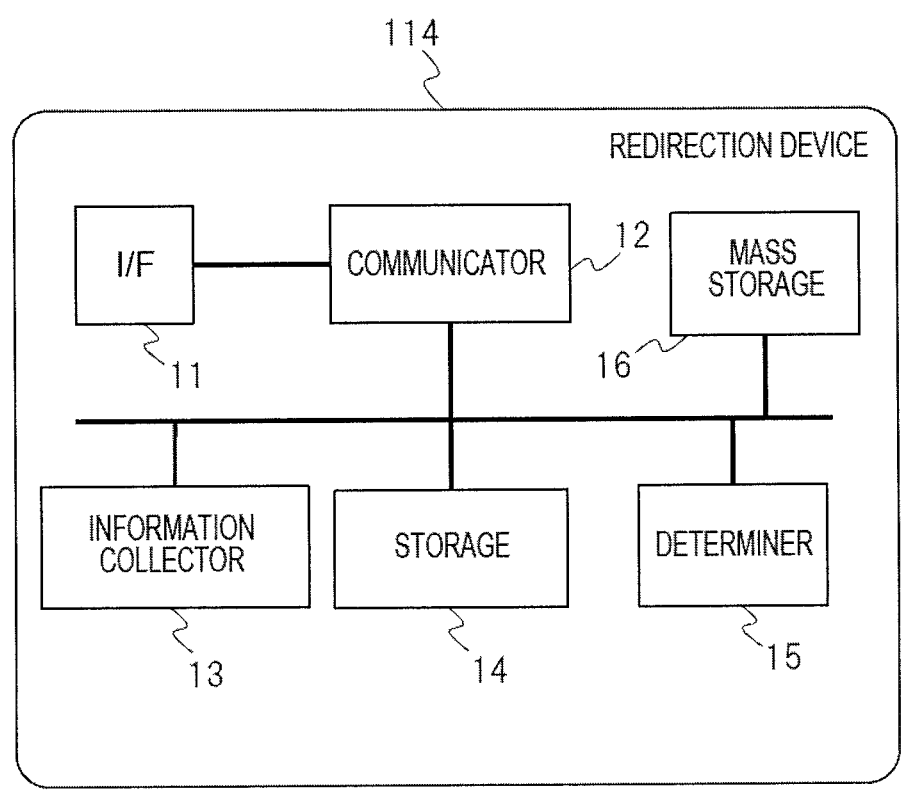
FIG. 11 is a block diagram of a redirection device according to a third embodiment.

FIG. 11 is a block diagram of the redirection device 114 according to this embodiment. In this figure, a mass storage 16 is added as a storage device to the redirection device 114 in the first and second embodiments illustrated in FIG. 4. As specific examples of the mass storage 16, HDDs, SSDs, or the like can be used.

The redirection device 114 specifies the data unit to be stored in the redirection device 114, itself and saves the data unit in the mass storage (storage device) 16. The data unit to be saved is specified by referring to the relaying device (or the storage device). Methods used in conventional caching devices can be used. Specifically, the following methods can be used.

(1) Storing data units accessed by a plurality of relaying devices (data units identified by data acquisition requests sent by the terminals)
(2) Storing data units with relatively high or low reference counts in the relaying device
(3) Storing data units with sizes greater or smaller than the threshold value.

Cases when the arrangement algorithm of the determined-later-method in the first embodiment is used for the method (1) above will be described. If the redirection device 114 detects that the data acquisition request for the same data unit are received by relaying devices, the redirection device 114 stores the corresponding data unit to the mass storage 16. To avoid duplicate data units in both the redirection device 114 and the relaying device, it is possible to send instructions to the relaying devices to delete data. If instructions are not issued, the management algorithm of the relaying device manages stored data units based on the period of validity or the like.

If the arrangement algorithm of the determined-first-method is used in method (1) described above, data units that are likely to be used by a plurality of relaying devices can be stored in the mass storage 16 of the redirection device 114. It is assumed that the redirection device 114 can acquire a list including the popularity of data units, as described in the first embodiment, for example. The redirection device 114 determines the relaying device to assign the data unit by using the list, as described in the first embodiment. If the redirection device 114 selects a plurality of relaying devices for some data unit, the redirection device 114 stores the data unit in the plurality of relay devices and the mass storage 16 of the redirection device 114. Thus, it is possible to adopt the methods to this embodiment relatively easily. After the redirection device 114 has confirmed that the data unit is stored in the mass storage 16, the assignments of the data unit to relaying devices are terminated. Then, other data units can be assigned to the relaying devices.

Also, data units with the highest popularities (e.g., the top 100) can be stored automatically in the mass storage 16 of the redirection device 114.

Next, cases when the arrangement algorithm of determined-later-method is used for method (2) above will be described. As in the first embodiment, the redirection device 114 has information on the reference counts of data units stored in each relaying device. Based on the reference counts, the redirection device 114 specifies data units with low reference counts despite the fact that a certain period has elapsed, within the data units stored in the relaying devices (e.g., the reference counts are less than threshold value). The redirection device 114 saves the specified data unit to mass storage 16. Data units can be copied or moved from each relaying device. The newest data unit with the same content identifier can be acquired by accessing the origin server. Data units with reference counts lower than threshold values can be excluded from data units stored in the redirection device 114.

When using the arrangement algorithm of the determined-first-method for method (2) described above, the reference counts in the past or the reference counts which is anticipated based on the reference counts of the past (≈popularity) is used. The remaining tasks are the same as the determined-later-method. In the above explanation of determined-later-method operation, a case when the reference count is lower than the threshold value has been described as an example. However, the same tasks can be executed even when the reference count is greater than the threshold value.

By storing data units accessed less frequently to the redirection device 114, the consumption of storage for each of the relaying devices can be reduced. By storing data units accessed more frequently to the redirection device 114, workloads are shifted towards the redirection device 114, reducing the workload of the relaying devices.

Next, cases when the arrangement algorithm of the determined-later-method is applied to method (3) described above will be explained. The redirection device 114 determines whether the size of the requested data unit is larger or smaller than the threshold value. Depending on the results, it is determined whether the data unit is stored in the redirection device 114 or the relaying device. When it is determined that the data unit should be stored in the relaying device, the redirection device 114 sends the instructions for saving the data unit to the relaying device.

If the arrangement algorithm of determined-first-method is used in method (3), information on the size of data units needs to be included in the list. Based on the sizes of the respective data units included in the list, the redirection device 114 can determine whether the data unit should be stored in the redirection device 114 or the relaying device.

If the arrangement algorithm of determined-later-method is used in methods (2) or (3), the acquisition of the data unit that needs to be saved and the saving operation of data unit can be executed by the redirection device 114, in a predetermined timing. These tasks can be executed when the capacity of storage available in any of the relaying devices within the scope of management is equal to or less than the threshold value.

Fourth Embodiment: Relaying Devices with the Redirection Functions

In the embodiments described above, the redirection device 114 was selecting the relaying device to store the data unit. In this embodiment, cases when the function of the redirection device 114 is provided in the relaying device are explained.

Figure 12:
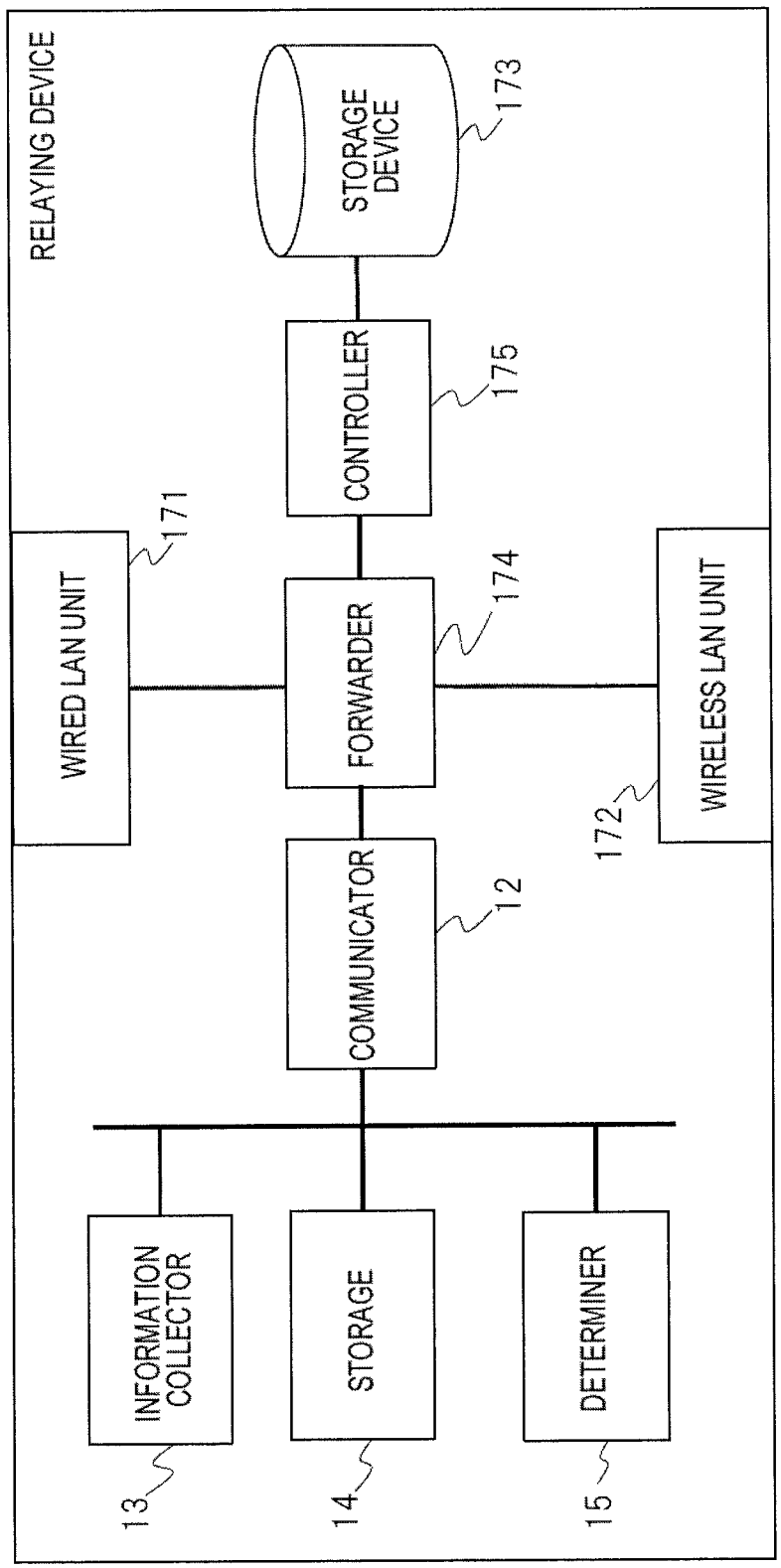
FIG. 12 is a block diagram of a relaying device according to a fourth embodiment.

FIG. 12 illustrates a relaying device according to this embodiment. This configuration includes both the features of the redirection device 114 and the features of the relaying device described above, incorporated in hardware level. The communicator 12, the information collector 13, the storage 14, and the determiner 15 in FIG. 12 are the same as the corresponding components in FIG. 4. The wired LAN unit 171, the wireless LAN unit 172, and the storage device 173 are the same as the corresponding components in FIG. 9. The I/F unit 11 of FIG. 4 is included in the wired LAN unit 171. A forwarder 174 transfer frames or packets between a network connected to the wired LAN unit 171 and a wireless network connected to the wireless LAN unit 172. A controller 175 controls the operation of the whole relaying device. The controller 175 performs various tasks described in the above embodiments (control of relaying, control of redirection device 114, control of terminal 113). The storage device 173 may serve as the mass storage 16 in FIG. 11. Other separate storage devices corresponding to the mass storage 16 may be provided, additionally.

Figure 13:
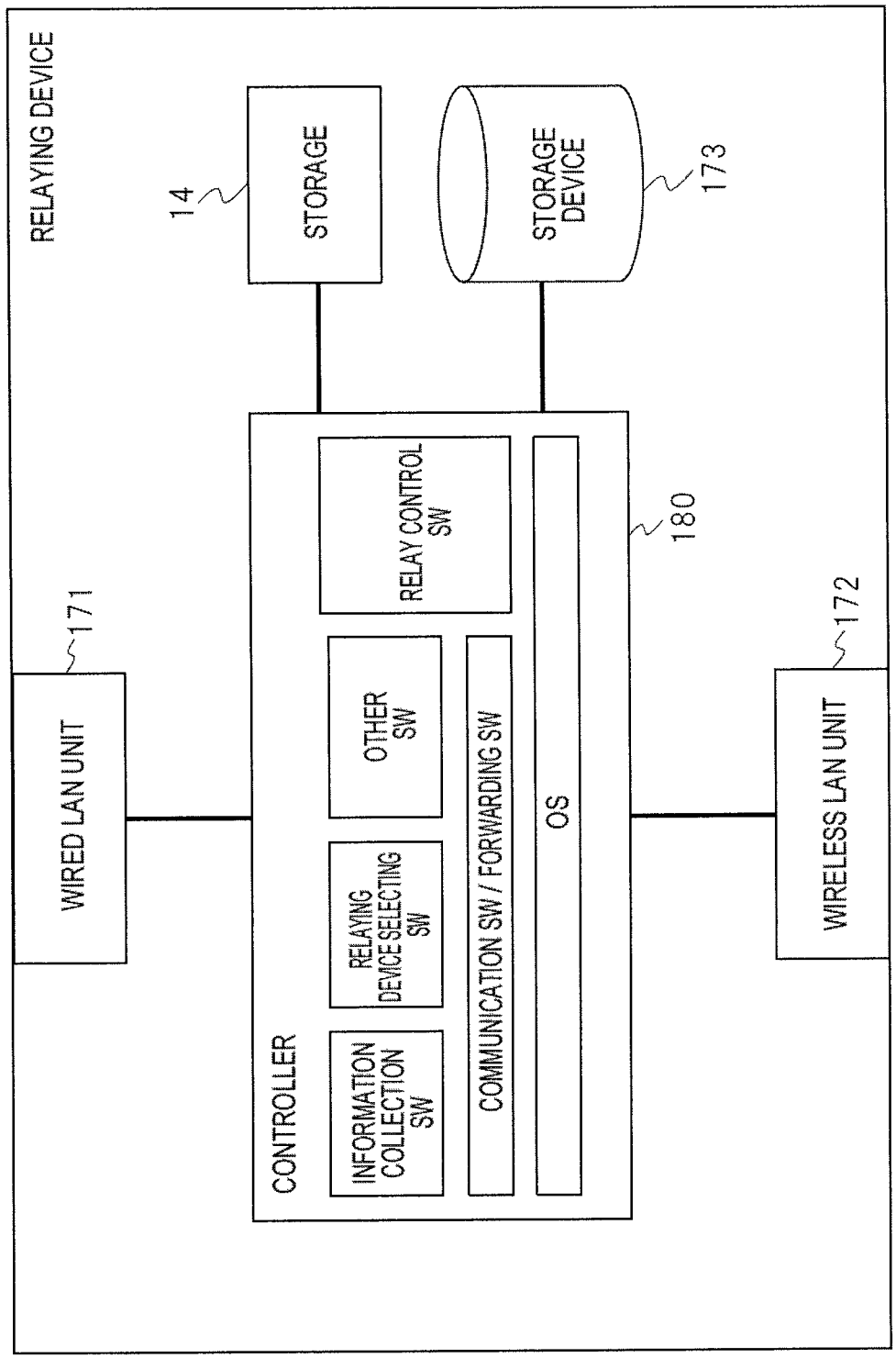
FIG. 13 is a block diagram of another configuration example of the relaying device according to the fourth embodiment.

FIG. 13 illustrates a configuration of the relaying device when features of the redirection device 114 are implemented in software operating on the controller. In the block of a controller 180, software implementing the individual functions is shown. The software operates on the controller 180. The controller 180 includes processors such as the CPU. Information collection SW corresponds to the information collector 13. Determination SW corresponds to the determiner 15. Communication SW includes the function of the communicator 12. Relay control SW controls the relaying of data which the controller 175 illustrated in FIG. 12 would perform, otherwise. Other SW performs tasks associated with the redirection device 114, the tasks associated with the terminal 113, or the like. The software mentioned above run on the operating system (OS). The block corresponding to the OS is also shown in the figure. The storage SW performs tasks such as data management or the like. The task of actually storing data is executed by hardware in storage 14 or the storage device 173. Thus, without installing special devices to the relaying device, the functionality of the redirection device can be realized.

Fifth Embodiment: Wireless LAN Controller with Redirection Function

Figure 14:
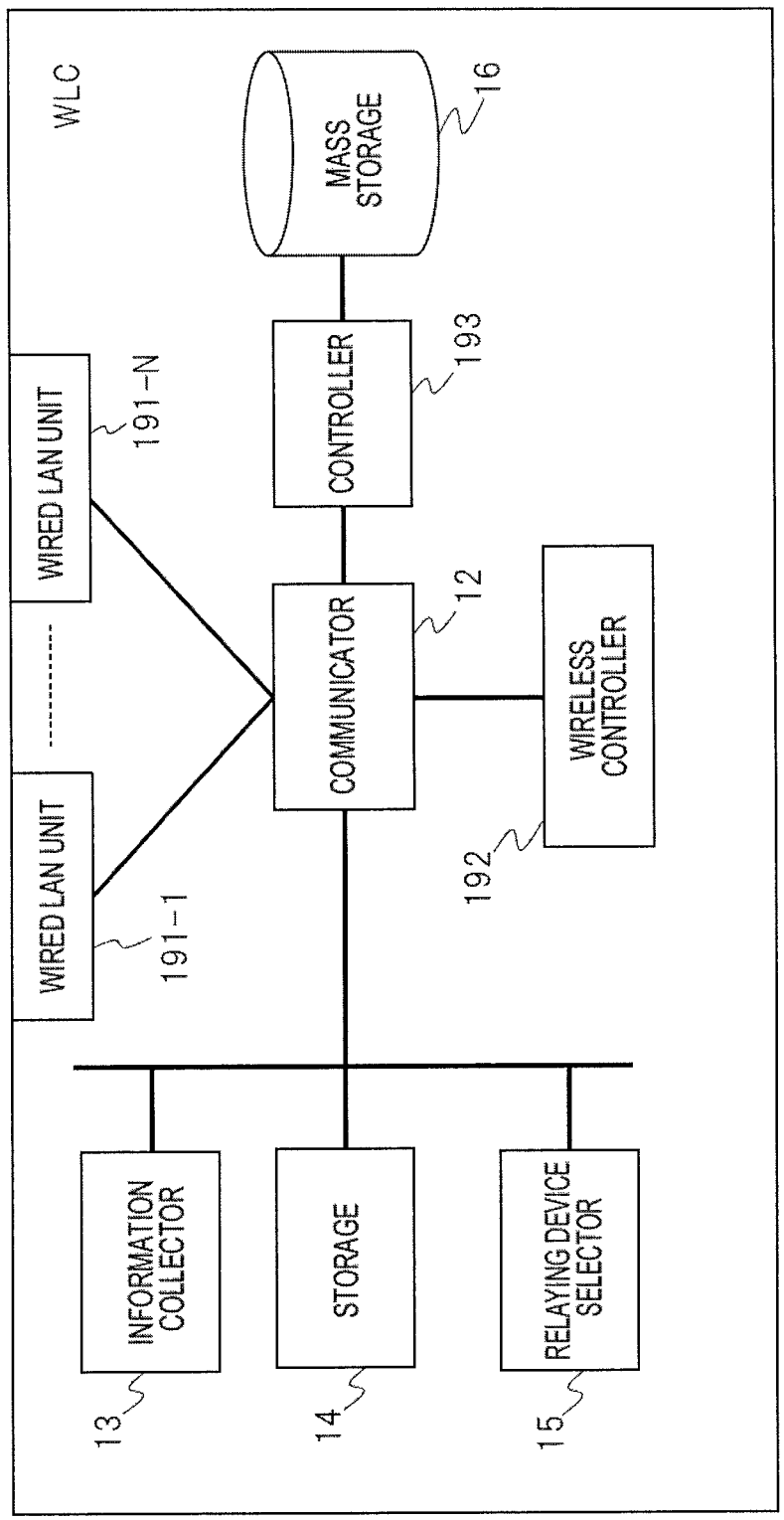
FIG. 14 is a block diagram illustrating a configuration of a WLC according to a fifth embodiment.

In this embodiment, a wireless LAN controller (WLC) has the functionality of the redirection device 114. FIG. 14 illustrates the configuration of the WLC according to this embodiment. As illustrated in FIG. 14, the WLC includes the communicator 12, the information collector 13, the storage 14, the determiner 15, the mass storage 16, a plurality of wired LAN units 191-1 to 191-N, a wireless controller 192, and a controller 193. The wired LAN units 191-1 to 191-N are connected to a wired network (the network 101). Although multiple wired LAN units are provided, it is possible to use only a single wired LAN unit. The wireless controller 192 handles the wireless communication via each relaying device. The wireless controller 192 also controls and monitors wireless parameters such as the intensity of radio waves for each relaying device. The communicator 12 handles interactions based on protocols of the upper layer of wired LAN or the like. The controller 193 controls the whole device (including the control of the wireless controller 192, communicator 12, or the like). The configuration illustrated in FIG. 14 can be realized by attaching hardware components necessary for adding the redirection features to the existing WLC hardware.

Figure 15:
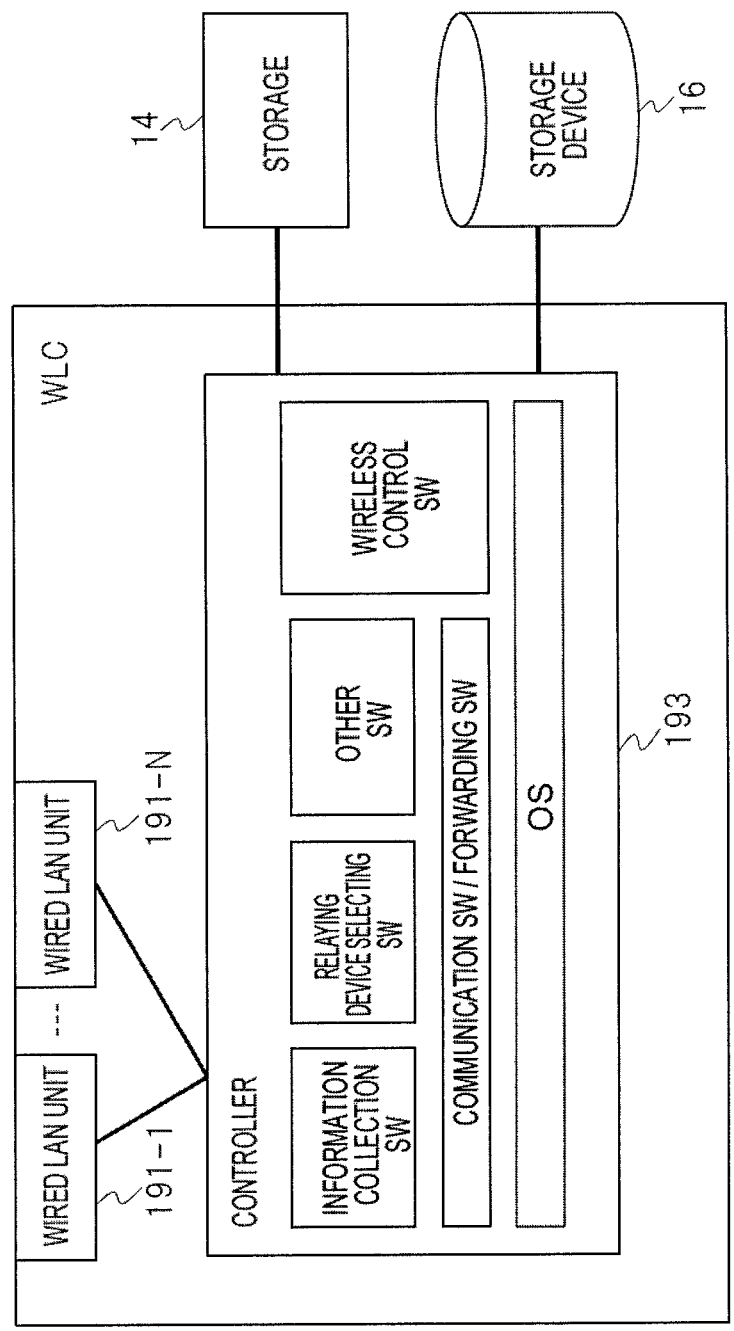
FIG. 15 is a block diagram illustrating another configuration example of the WLC according to the fifth embodiment.

FIG. 15 illustrates a configuration example of the WLC when the redirection function is executed by software. As illustrated in FIG. 15, the redirection function is realized by software operating in the controller 193. Wireless control SW is software with the functionality of the wireless controller 192 in FIG. 14 (although the wireless control SW is configured as a hardware element in FIG. 14, it can be configured as software operating on the controller). Information related to the wireless network the relaying device is connected is generally aggregated in control devices such as WLC. The cost of collecting information (communication overhead, etc.) can be reduced by installing the redirection function in the control devices.

Sixth Embodiment: Configuring the Relaying Device and the Storage Device as Separate Devices In the embodiments described above, it was assumed that the relaying devices (e.g., wireless LAN access points) include storage devices.

In this embodiment, the main body of the relaying device and the storage device are implemented separately.

Figure 16:
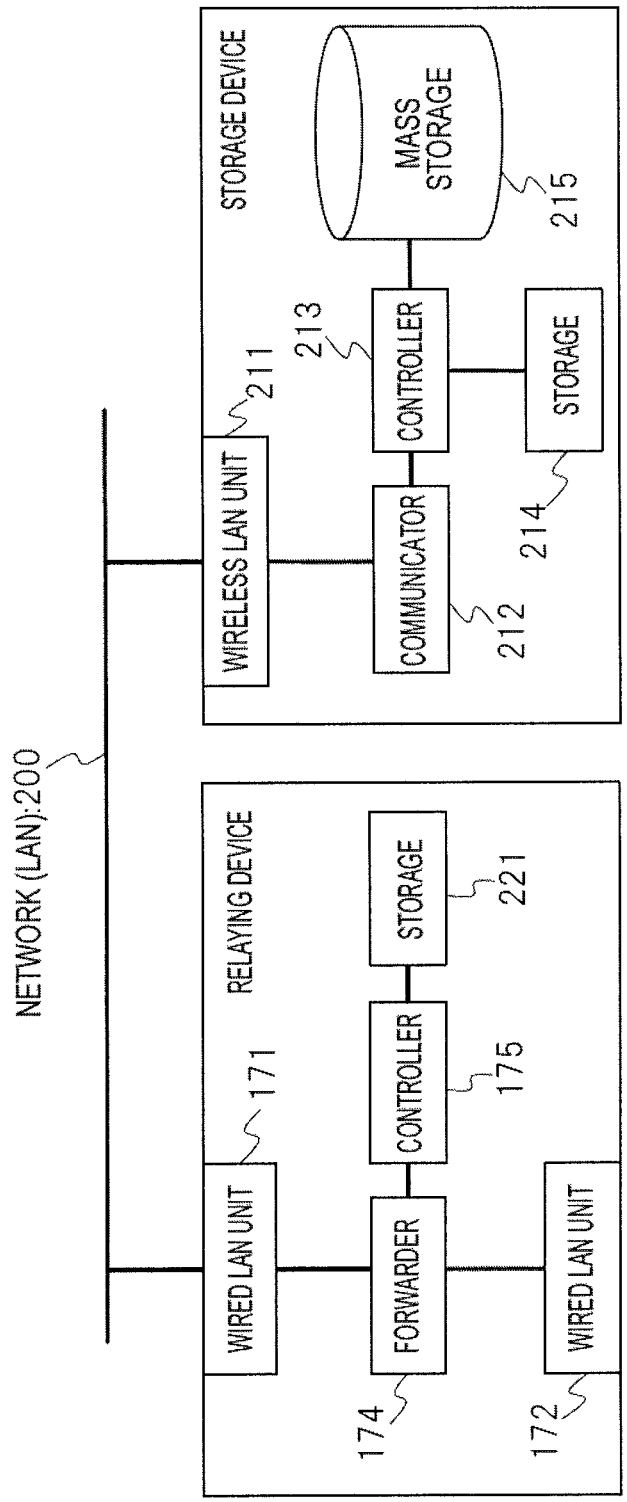
FIG. 16 is a diagram illustrating an example of a configuration where a relaying device and a storage device according to a sixth embodiment are connected to each other with a network.

FIG. 16 illustrates a first example of the relaying device and the storage device according to this embodiment. The relaying device and the storage device are stored in separate housings. The relaying device and the storage device are connected to each other via a network (here, LAN) 200.

The relaying device includes the wired LAN unit 171, the wireless LAN unit 172, the forwarder 174, the controller 175, and a storage 221. The storage 221 is a storage element configured to store information or the like which is needed to make the relaying device operate. The storage 221 is different from the aforementioned storage device. The storage 221 can be a volatile or non-volatile memory, for example.

The storage device includes a wired LAN unit 211, a communicator 212, a controller 213, a storage 214, and a mass storage 215. The mass storage 215 is a storage component for storing data. The controller 213 controls the overall operation of the storage device. The storage 214 stores information or data needed for the operation of the storage device. The storage 214 can be volatile or nonvolatile memory, for example. The communicator 212 handles interaction based on communication protocols in the upper layers of the wired LAN.

First, the redirection device 114 needs to specify the relaying device located in the vicinity of the storage device which is registered. The relaying device can be specified based on the fact that the relaying device is connected to the same network as the storage device. Also, whether the round-trip delay of the network is less than or equal to the threshold value can be used to specify the relaying device. Also, the association between the relaying device and the storage device configured by the administrator can be obtained by making an inquiry to the management device which manages the relaying device. The administrator can also preconfigure the association between the relaying device and the storage device in the redirection device 114.

For the relaying devices and the storage devices to be associated, the two devices need to be located close enough to each other, and the network connection between the devices need to use frequency bands that do not interfere with signals of information sent from the storage device. When the association described above is determined, the bandwidth of signals can be measured. If sufficient bandwidth cannot be found, the process can be aborted without forming an association. If the relaying device and the storage device are connected directly, the relaying device and the storage device can be always associated. "Connected directly" means that the two distinct devices are connected physically.

Regardless of the association, the redirection device 114 can treat the relaying devices and storage devices similarly as described in the above embodiments. For example, the redirection device 114 can communicate directly with only the relaying device. Direct communication with the storage device is not allowed. In another example, the redirection device 114 can be configured to communicate directly with both the relaying device and the storage device. In this case, it is also possible to send data storage instructions, transfer instructions, or the like directly to the storage device. Also, it is also possible to collect the characteristic information directly from the storage device. It is also possible to send requests (data acquisition requests, data saving requests, etc.) generated by the terminal directly to the storage device via the relaying devices. The communication may be performed only with the relaying devices. Communication between the relaying device and the storage device can be concealed so that it is not apparent from other devices.

Figure 17:
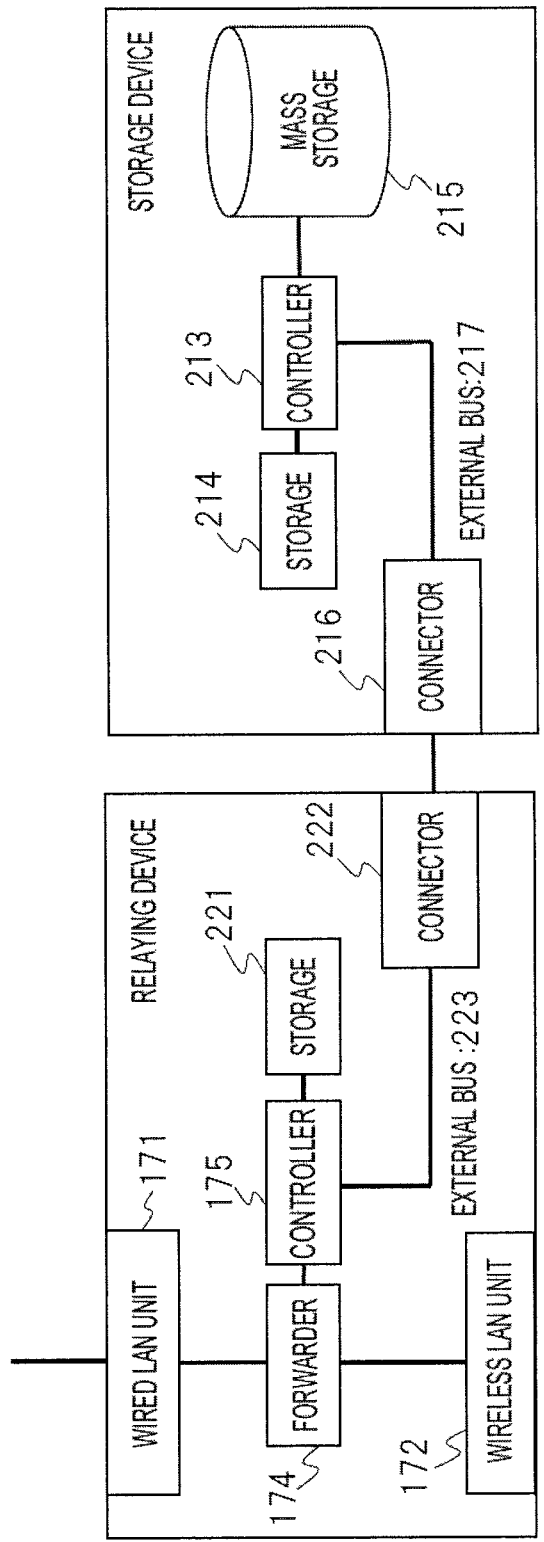
FIG. 17 is a diagram illustrating another example of the configuration where the relaying device and the storage device according to the sixth embodiment are connected to each other with the network.

FIG. 17 illustrates a second example of the relaying device and the storage device according to this embodiment. The relaying device is provided with a connector 222. The connector 222 is connected to the controller 175 via an external bus 223. The storage device is provided with a connector 216. The connector 216 is connected to the controller 213 via an external bus 217. The external buses 223 and 217 are general-purpose external buses such as PCI Express. The relaying device and the storage device are connected to each other via the connectors 222 and 216, forming pairs with one-by-one relationships. According to this configuration, the redirection device 114 does not need to perform the complicated tasks of detecting the associations between the relaying devices and the storage devices as in the case of FIG. 16.

Figure 18:
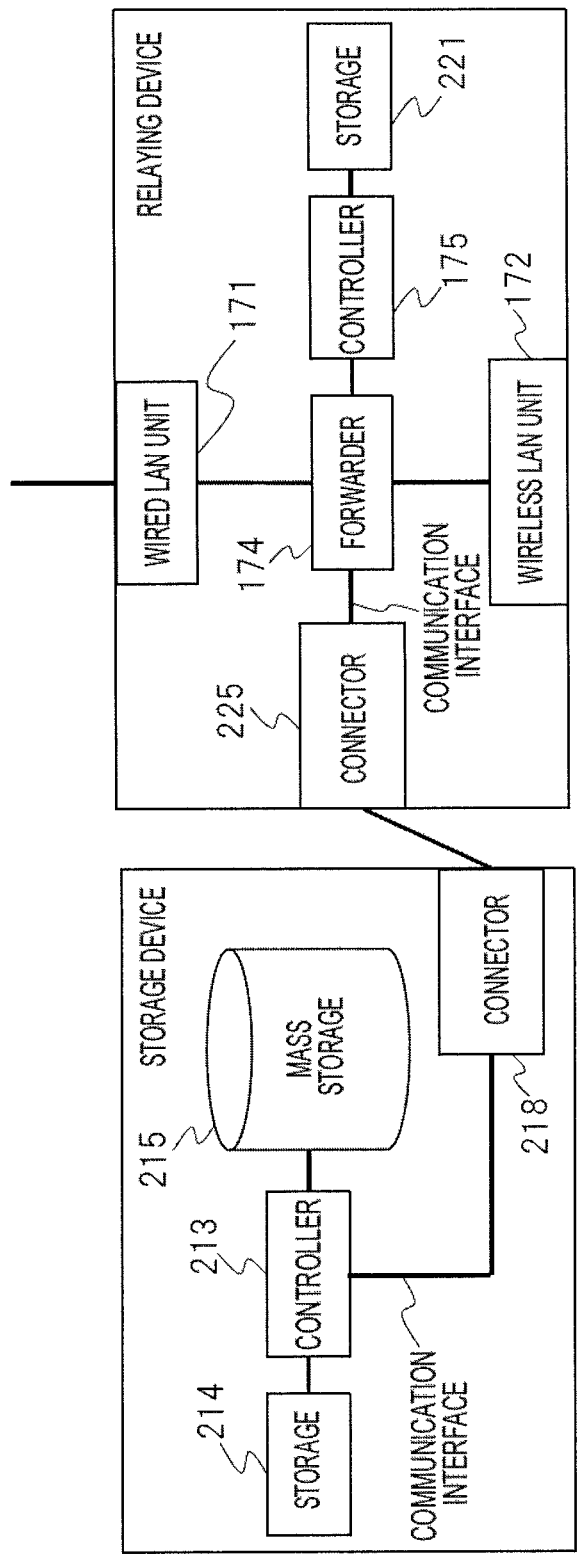
FIG. 18 is a diagram illustrating a configuration example in which the relaying device and the storage device according to the sixth embodiment are connected to each other.
Figure 19:
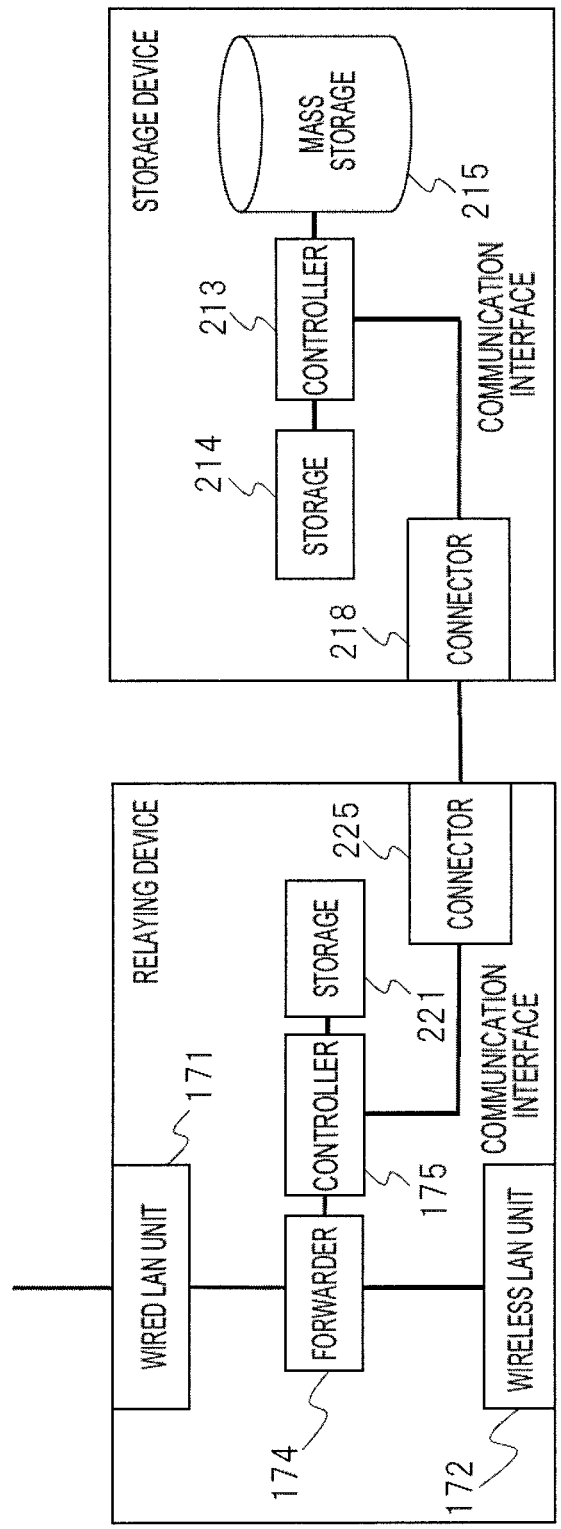
FIG. 19 is a diagram illustrating another configuration example in which the relaying device and the storage device according to the sixth embodiment are connected to each other.

FIG. 18 illustrates a configuration in the case when relaying devices and storage devices are connected using communication interfaces compliant with standards such as SGMII, XGMII, USGXMII, or the like. FIG. 19 illustrates another configuration in the case when the relaying device and the storage device are connected using the same communication interface.

In FIG. 19, the controller 175 of the relaying device and the controller 213 of the storage device are connected directly to each other via a connector 225 and a connector 218, respectively. On the other hand, in FIG. 18, the forwarder 174 is located between the controller 175 and the connector 225 of the relaying device.

In the configuration of FIG. 19, the relaying device and the storage device are basically connected directly to each other, forming one-by-one pairs. Thus, the complicated operation of detecting the association between the relaying device and the storage device described above is not necessary. In the configuration of FIG. 18, since multiple devices (storage devices, other relaying devices, etc.) are connected via the forwarder, detection of association between the devices may be required. However, since the relaying device and the storage device have direct-physical connections, it is possible to simplify the procedures of detection.

Thus, data can be arranged and managed by the redirection device 114 even when relaying devices and storage devices are configured as separate devices.

The embodiments described above are applicable to wireless LAN technology known as IEEE 802.11. However, application to wireless LAN technology is only an example and the embodiments described herein are also applicable to other wireless communication technologies (e.g., cellular communication such as LTE (Long Term Evolution) and 5th generation mobile communication systems, short range wireless communication known as IEEE 802.15, or the like). In other words, the technology based on the invention of the present application can also be applied to a relaying device and accompanying devices compatible with wireless communication technologies other than the wireless LAN technology, as well as a relaying device that adopts a plurality of wireless communication schemes combined.

The terms used in this and other embodiments should be construed in their broad senses. For example, the term "processor" as used herein may encompass a general-purpose processor, a central processing unit (CPU), a microprocessor, a digital signal processor (DSP), a controller, a microcontroller, a state machine, or the like. Depending upon the situation, a "processor" as used herein may refer to an application specific integrated circuit, a field programmable gate array (FPGA), a programmable logic circuit (PLD), or the like. A "processor" as used herein may refer to a combination of processing devices such as microprocessors, a combination of a DSP and a microprocessor, and one or more microprocessors cooperating with a DSP core.

As another example, the term "memory" as used herein may encompass any electronic component capable of storing electronic information. "Memory" may refer to random access memory (RAM), read only memory (ROM), programmable read only memory (PROM), erasable programmable read only memory (EPROM), electrically erasable PROM (EEPROM), non-volatile random access memory (NVRAM), flash memory, magnetic or optical data storage, which are readable by a processor. If the processor reads and/or writes information to and/or from the memory, it can be said that the memory is communicating electrically with the processor. The memory may be integrated in the processor, and, in this case too, it can be said that the memory is communicating electrically with the processor.

Also, the term "storage device" or "storage" as used herein may encompass any device that employs magnetic technology, optical technology, or non-volatile memory for data storage. For example, the storage device or the storage may be an HDD, an optical disk, an SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication control device comprising:
processing circuitry configured to:
receive
1) at least one of wired communication characteristic information or wireless communication characteristic information, for a plurality of relaying devices that relay communication between a wired network and a wireless network, from the relaying devices or a management server that manages the relaying devices,
the wired communication characteristic information including communication quality of the wired network and throughput of the wired network,
the wireless communication characteristic information including at least one of: (1) throughput and an error rate of the wireless network or (2) an error rate of at least one terminal which is connected to the wireless network and including at least one of communication quality of the wireless network or communication quality of the at least one terminal,
2) storage characteristic information indicating usage of a plurality of storage devices storing data units that are transferred via the relaying devices and sent or received by a terminal in the wireless network and connected directly to the relaying devices or connected via the wired network, the storage characteristic information including a number of rewrites in the storage devices and error rates in the storage devices and
3) data characteristic information indicating states of a plurality of data units stored in each of the storage devices;
receive a data acquisition request or a data saving request sent from the terminal;
specify a relaying device or a storage device that processes the data acquisition request or the data saving request based on the wired communication characteristic information, the wireless communication characteristic information, the storage characteristic information, and the data characteristic information; and
send an instruction to the terminal, instructing to transmit the data acquisition request or the data saving request to the specified relaying device or the specified storage device.

2. The wireless communication device according to claim 1, wherein the processing circuitry is configured to:
determine whether the data unit requested by the data acquisition request is stored in the storage device corresponding to the relaying device the terminal is connected;
send an instruction to the terminal, to transmit the data acquisition request to the relaying device the terminal is connected or the storage device corresponding to the relaying device, when the data unit is stored in the storage device;
specify a storage device to store the data unit based on at least either the wired communication characteristic information, the wireless communication characteristic information, the storage characteristic information, or the data characteristic information, and send an instruction to receive and store the data unit to the specified storage device or a relaying device corresponding to the specified storage device, when the data unit is not stored in the storage device; and send an instruction to the terminal, instructing to transmit the data acquisition request to the specified storage device or the relaying device corresponding to the specified storage device.

3. The communication control device according to claim 2, wherein the processing circuitry is configured to:

determine whether a total number of requests for the data unit requested by the data acquisition request exceeds a threshold value or not;

send an instruction to the specified storage device or the relaying device corresponding to the specified storage device, and the instruction instructing the specified storage device or the relaying device corresponding to the specified storage device to receive and store the data unit, and send an instruction to the terminal, instructing the terminal to transmit the data acquisition request to the specified storage device or the relaying device corresponding to the specified storage device when the total number of requests is exceeding the threshold value; and receive the data unit and transmit the received data unit to the terminal, when the total number of requests is not exceeding the threshold value.

4. The communication control device according to claim 1, wherein the processing circuitry is configured to:

determine whether a total number of requests that have been directed to a relaying device the terminal is connected or a storage device corresponding to the relaying device for the data unit requested by the data acquisition request exceeds a threshold value, when the data unit requested by the data acquisition request is not stored in the storage device corresponding to the relaying device the terminal is connected;

send an instruction to the relaying device the terminal is connected or the storage device corresponding to the relaying device, the instruction instructing the relaying device the terminal is connected or the storage device corresponding to the relaying device to receive and store the data from a storage device storing the data unit when the total number of requests is exceeding the threshold value; and send an instruction to the terminal instructing the terminal to transmit the data acquisition request to the storage device storing the data unit or a relaying device corresponding to the storage device storing the data unit, when the total number of requests is not exceeding the threshold value.

5. The communication control device according to claim 1, wherein the processing circuitry is configured to select a storage device to serve as a location of storage for the data unit stored in the storage device based on at least either the wired communication characteristic information, the wireless communication characteristic information, the storage characteristic information, or the data characteristic information, and configured to send an instruction to the selected storage device or a relaying device corresponding to the selected storage device, the instruction instructing the selected storage device or the relaying device corresponding to the selected storage device to receive and store the data unit.

6. The communication control device according to claim 5, wherein the processing circuitry is configured to determine size of data to be stored in the storage device serving as the location of storage, and send an instruction instructing to save a part of the data unit equal to the size of data.

7. The communication control device according to claim 5, wherein the processing circuitry is configured to identify, based on a list identifying a plurality of data units, the storage device storing at least one data unit indicated in the list, and configured to determine a storage device serving as a location of storage for storing the data unit, and configured to send an instruction to the determined storage device or a relaying device corresponding to the determined storage device, the instruction instructing the determined storage device or the relaying device corresponding to the determined storage device, to receive and store the data unit.

8. The communication control device according to claim 7, wherein the processing circuitry is configured to determine a plurality of storage devices for storing a plurality of data fragments obtained by dividing the data unit, and configured to send instructions to the plurality of storage devices or a plurality of relaying devices corresponding to the storage devices, the instructions instructing the storage devices or the relaying devices corresponding to the storage devices to receive and store respective fragments, each corresponding to each of the data fragments obtained by dividing the data unit received from the storage device storing the data unit.

9. The communication control device according to claim 7, wherein the list includes at least sizes or popularity of the data units, and the processing circuitry is configured to determine the location of storage for the data based on at least either the size or the popularity of the data unit.

10. The communication control device according to claim 7, wherein the list includes information regarding a period of validity for the data unit, and the processing circuitry is configured to determine the storage device serving as the location of storage for the data unit based on degradation of the storage devices which is recognized from the storage characteristic information and the period of validity for the data unit.

11. The communication control device according to claim 5, wherein the processing circuitry is configured to recognize at least either a number of terminals connecting to each relaying device and a route of movement of a terminal connected to each relaying device, and configured to determine a storage device serving as the location of storage based on at least either the number of terminals connected or the route of movement.

12. The communication control device according to claim 2, wherein the processing circuitry is configured to update at least the wired communication characteristic information, or the wireless communication characteristic information, or the storage characteristic information to latest information when receiving the data acquisition request from the terminal, and configured to determine a storage device serving as the location of storage based on the updated information.

13. The communication control device according to claim 1, wherein the processing circuitry sends an instruction to the specified relaying device or the specified storage device, the instruction instructing the specified relaying device or the specified storage device to allocate storage space for storing the data unit requested by the data saving request, when receiving the data saving request.

14. The communication control device according to claim 13, wherein the processing circuitry identifies an identifier for a user of the terminal, and determines based on the identifier, whether the user is authorized to use a storage device corresponding to the specified relaying device or the specified storage device, and sends the instruction only when the user is authorized.

15. The communication control device according to claim 1, further comprising a storage device configured to store data units,
    wherein the processing circuitry identifies a data unit which satisfy a predetermined condition from the data units stored in the plurality of storage devices, and receives the identified data unit from the storage device storing the identified data unit from the plurality of storage devices, and stores the received data unit in the storage device within the communication control device, and
    when a data acquisition request for the data unit stored in the storage device within the communication control device is received, the processing circuitry reads the data unit stored in the storage device within the communication control device and sends the read data unit to the terminal.

16. The communication control device according to claim 15, wherein, when the data unit stored in the storage device within the communication control device no longer satisfies the predetermined condition, the processing circuitry sends an instruction to the storage device specified from the plurality of storage devices, the instruction instructing the specified storage device to store the data unit.

17. A communication control method comprising:
    performing
    1) receiving at least one of wireless communication characteristic information or wired communication characteristic information of a plurality of relaying devices, from a plurality of relaying devices that relay communication between a wired network and a wireless network, or from a management server managing the plurality of relaying devices,
        the wired communication characteristic information including communication quality of the wired network and throughput of the wired network,
        the wireless communication characteristic information including at least one of: (1) throughput and an error rate of the wireless network or (2) an error rate of at least one terminal which is connected to the wireless network and including at least one of communication quality of the wireless network or communication quality of the at least one terminal,
    2) receiving storage characteristic information of a plurality of storage devices connected directly to the plurality of relaying devices or a plurality of storage devices connected via the wired network, storing data units that are transferred via the relaying devices and sent or received by a terminal in the wireless network, the storage characteristic information including a number of rewrites in the storage devices and error rates in the storage devices and
    3) receiving data characteristic information indicating of states of a plurality of data units stored in each of the plurality of storage devices;
    receiving a data acquisition request or a data saving request transmitted from the terminal;
    specifying a relaying device or a storage device that processes the data acquisition request or the data saving request based on the wired communication characteristic information, the wireless communication characteristic information, the storage characteristic information, and the data characteristic information; and
    sending an instruction to the terminal, instructing the terminal to transmit the data acquisition request or the data saving request to the specified relaying device or the storage device.

18. A communication control device comprising:
    processing circuitry configured to:
    receive
    1) at least one of wired communication characteristic information or wireless communication characteristic information, for a plurality of relaying devices that relay communication between a wired network and a wireless network, from the relaying devices or a management server that manages the relaying devices,
    2) storage characteristic information indicating usage of a plurality of storage devices storing data units that are transferred via the relaying devices and sent or received by a terminal in the wireless network and connected directly to the relaying devices or connected via the wired network, and
    3) data characteristic information indicating states of a plurality of data units stored in each of the storage devices;
    receive a data acquisition request or a data saving request sent from the terminal;
    specify a relaying device or a storage device that processes the data acquisition request or the data saving request based on the wired communication characteristic information or the wireless communication characteristic information, the storage characteristic information, and the data characteristic information; and
    send an instruction to the terminal, instructing to transmit the data acquisition request or the data saving request to the specified relaying device or the specified storage device.

* * * * *